(12) United States Patent
Yu et al.

(10) Patent No.: US 11,990,966 B2
(45) Date of Patent: May 21, 2024

(54) CHANNEL STATE INFORMATION FEEDBACK METHOD AND APPARATUS

(71) Applicant: Huawei Technologies Co., Ltd., Shenzhen (CN)

(72) Inventors: Jian Yu, Shenzhen (CN); Weimin Wu, Wuhan (CN); Jing Dai, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/957,563

(22) Filed: Sep. 30, 2022

(65) Prior Publication Data

US 2023/0097165 A1    Mar. 30, 2023

Related U.S. Application Data

(63) Continuation of application No. 17/314,422, filed on May 7, 2021, now Pat. No. 11,483,048, which is a
(Continued)

(30) Foreign Application Priority Data

Nov. 7, 2018 (CN) .......................... 201811321478.9

(51) Int. Cl.
*H04L 27/28* (2006.01)
*H04B 7/06* (2006.01)
(52) U.S. Cl.
CPC ......... *H04B 7/0626* (2013.01); *H04B 7/0617* (2013.01)
(58) Field of Classification Search
CPC . H04W 16/28; H04W 72/121; H04W 72/542; H04W 88/08; H04W 24/08;
(Continued)

(56) References Cited

U.S. PATENT DOCUMENTS 9,831,929 B2    11/2017  Porat et al.
10,560,242 B2 *  2/2020  Chun ................... H04L 5/0055
(Continued)

FOREIGN PATENT DOCUMENTS

CN    103001745 A    3/2013
CN    106454930 A    2/2017
(Continued)

OTHER PUBLICATIONS

IEEE Std 802.11ac TM-2013, "Part 11: Wireless LAN Medium Access Control (MAC) and Physical Layer (PHY) Specifications, Amendment 4: Enhancements for Very High Throughput for Operation in Bands below 6 GHZ," Dec. 11, 2013, 425 pages.
(Continued)

*Primary Examiner* — Khai Tran
(74) *Attorney, Agent, or Firm* — Conley Rose, P.C.

(57) ABSTRACT

A channel state information feedback method and an apparatus to flexibly feed back channel state information, to implement balance between feedback overheads and feedback precision of the channel state information. The method includes sending a media access control (MAC) frame, where the MAC frame includes a processing mode bitmap, every n bits in the processing mode bitmap correspond to one feedback unit, and a value of the n bits is used to indicate a processing mode of channel state information of the corresponding feedback unit; and receiving a beamforming report, where the beamforming report includes one or more feedback fields, each feedback field corresponds to one feedback unit, the feedback field includes channel state information of the corresponding feedback unit, and the channel state information included in the feedback field is processed in a processing mode indicated by the processing mode bitmap.

20 Claims, 19 Drawing Sheets

Related U.S. Application Data continuation of application No. PCT/CN2019/116318, filed on Nov. 7, 2019.

(58) Field of Classification Search
CPC .. H04B 7/0617; H04B 7/0639; H04B 7/0619; H04B 7/0626; H04B 17/309; H04B 7/0417; H04L 1/0026; H04L 5/0055; H04L 5/0007; H04L 27/2656; H04L 25/0224; H04L 5/0057
USPC ........................................ 375/260, 262, 267
See application file for complete search history.

(56) References Cited

U.S. PATENT DOCUMENTS

| | | | |
|---|---|---|---|
| 10,928,505 B1* | 2/2021 | Chu | G01S 13/765 |
| 2010/0220675 A1 | 9/2010 | Chun et al. | |
| 2012/0026909 A1 | 2/2012 | Seok | |
| 2014/0219385 A1 | 8/2014 | Yamaura | |
| 2015/0071366 A1* | 3/2015 | Nabar | H04B 7/0417 375/260 |
| 2016/0081075 A1 | 3/2016 | Kim et al. | |
| 2016/0261387 A1 | 9/2016 | Etemad et al. | |
| 2016/0262050 A1 | 9/2016 | Merlin et al. | |
| 2017/0054542 A1 | 2/2017 | Vermani et al. | |
| 2017/0093477 A1 | 3/2017 | Yamaura | |
| 2017/0170937 A1 | 6/2017 | Chun et al. | |
| 2018/0041919 A1 | 2/2018 | Takagi et al. | |
| 2018/0205442 A1 | 7/2018 | Oteri et al. | |
| 2018/0317128 A1 | 11/2018 | Chun et al. | |
| 2019/0261369 A1* | 8/2019 | Verma | H04B 7/0619 |
| 2019/0349067 A1* | 11/2019 | Huang | H04W 72/046 |
| 2022/0078792 A1* | 3/2022 | Jeon | H04W 72/0453 |
| 2022/0224381 A1* | 7/2022 | Yun | H04L 25/02 |
| 2022/0399923 A1* | 12/2022 | Suh | H04W 48/16 |
| 2022/0417063 A1* | 12/2022 | Yan | H04B 7/0626 |
| 2023/0098549 A1* | 3/2023 | Montemurro | H04B 7/0626 375/260 |
| 2023/0189223 A1* | 6/2023 | Chu | H04L 5/0048 370/329 |

FOREIGN PATENT DOCUMENTS

| | | |
|---|---|---|
| CN | 107645737 A | 1/2018 |
| EP | 2830250 A1 | 1/2015 |
| EP | 3133757 A1 | 2/2017 |
| JP | 2018512768 A | 5/2018 |
| KR | 20090039578 A | 4/2009 |

OTHER PUBLICATIONS

IEEE P802.11ax TM/D2.2, "Part 11: Wireless LAN Medium Access Control(MAC) and Physical Layer (PHY) Specifications, Amendment 6: Enhancements for High Efficiency WLAN," Feb. 2018, 620 pages.

Ron Porat et al, "Punctured NDP," IEEE 802.11-18/0477r0, Jul. 2018, 9 pages.

Narendar, et al, "Reducing Channel Sounding Protocol Overhead for 11ax," Sep. 15, 2015, 16 pages.

* cited by examiner

| Number of columns index | Number of rows index | Channel width | Number of grouping | Codebook information | Feedback type | Remaining feedback segment | First feedback segment | Resource unit start index | Resource unit end index | Sounding dialog token number | Reserved |
|---|---|---|---|---|---|---|---|---|---|---|---|

FIG. 4

| Processing mode indication information | Number of columns index | Number of rows index | Channel width | Number of grouping | Codebook information | Feedback type | Remaining feedback segment | First feedback segment | Resource unit start index | Resource unit end index | Sounding dialog token number | Reserved |
|---|---|---|---|---|---|---|---|---|---|---|---|---|

FIG. 5

| Processing mode bitmap | Number of columns index | Number of rows index | Channel width | Number of grouping | Codebook information | Feedback type | Remaining feedback segment | First feedback segment | Resource unit start index | Resource unit end index | Sounding dialog token number | Reserved |
|---|---|---|---|---|---|---|---|---|---|---|---|---|

FIG. 6

| |
|---|
| Quantity indication information |
| Processing mode bitmap |
| Number of columns index |
| Number of rows index |
| Channel width |
| Number of grouping bitmap |
| Codebook information bitmap |
| Feedback type |
| Remaining feedback segment |
| First feedback segment |
| Resource unit start index 1 |
| Resource unit end index 1 |
| ... |
| Resource unit start index n |
| Resource unit end index n |
| Sounding dialog token number |
| Reserved |

FIG. 14

CHANNEL STATE INFORMATION FEEDBACK METHOD AND APPARATUS

CROSS-REFERENCE TO RELATED APPLICATIONS

This is a continuation of U.S. patent application Ser. No. 17/314,422 filed on May 7, 2021, which is a continuation of International Patent Application No. PCT/CN2019/116318 filed on Nov. 7, 2019, which claims priority to Chinese Patent Application No. 201811321478.9 filed on Nov. 7, 2018. All of the aforementioned patent applications are hereby incorporated by reference in their entireties.

TECHNICAL FIELD

This application relates to the field of communications technologies, and in particular, to a channel state information feedback method and an apparatus.

BACKGROUND

In a wireless communications system such as a wireless local area network (WLAN), a multiple-input multiple-output (MIMO) technology is a widely used technology. When the MIMO technology is used, a beamformer needs to obtain channel state information from a beamformee, such that the beamformer implements functions such as beamforming, rate control, and resource allocation based on the channel state information.

An 802.11 standard is a universal WLAN standard. Currently, the Institute of Electrical and Electronics Engineers (IEEE) is discussing a next generation 802.11 standard after 802.11ax. Compared with the previous 802.11 standard, the next generation 802.11 standard supports data transmission with an extremely high throughput (EHT), that is, the next generation 802.11 standard supports a higher bandwidth (for example, 320 megahertz (MHz)) and more streams (for example, 16 spatial streams). In this way, the beamformee needs to feed back more pieces of channel state information to the beamformer, resulting in excessively high feedback overheads. Therefore, for the next generation 802.11 standard, how to feed back channel state information and implement balance between feedback overheads and feedback precision of the channel state information is an urgent problem to be resolved.

SUMMARY

This application provides a channel state information feedback method and an apparatus, to flexibly feed back channel state information, so as to implement balance between feedback overheads and feedback precision of the channel state information.

To achieve the foregoing objective, this application provides the following technical solutions.

According to a first aspect, a channel state information feedback method is provided, and includes the following steps. A beamformer sends a media access control (MAC) frame, where the MAC frame includes a processing mode bitmap, every n bits in the processing mode bitmap correspond to one feedback unit, a value of the n bits is used to indicate a processing mode of channel state information of the corresponding feedback unit, and n is a positive integer; and the beamformer receives a beamforming report sent by a beamformee, where the beamforming report includes one or more feedback fields, each feedback field corresponds to one feedback unit, the feedback field includes channel state information of the corresponding feedback unit, and the channel state information of the corresponding feedback unit is processed in a processing mode indicated by the processing mode bitmap.

Based on the foregoing technical solution, every n bits in the processing mode bitmap correspond to one feedback unit, and the value of the n bits is used to indicate the processing mode of the channel state information of the corresponding feedback unit. It may be understood that different processing modes correspond to different feedback overheads and different feedback precision. Therefore, for channel state information of some feedback units (for example, relatively important channels), the beamformer may indicate, using the processing mode bitmap, the beamformee to use a processing mode with relatively high feedback precision, to ensure feedback precision. For channel state information of some other feedback units (for example, unimportant channels), the beamformer may indicate, using the processing mode bitmap, the beamformee to use a processing mode with relatively low feedback overheads, to reduce feedback overheads. In this way, the beamformer may configure a proper processing mode based on a requirement, and indicate the beamformee to process channel state information of different feedback units in different processing modes, to implement balance between feedback overheads and feedback precision of the channel state information when the channel state information is fed back.

In a possible design, the feedback unit is a segment, a resource unit, or a channel.

In a possible design, the MAC frame is a null data packet announcement (NDPA) frame or a beamforming report poll trigger frame.

According to a second aspect, a channel state information feedback method is provided, and includes the following steps. A beamformee receives a MAC frame sent by a beamformer, where the MAC frame includes a processing mode bitmap, every n bits in the processing mode bitmap correspond to one feedback unit, a value of the n bits is used to indicate a processing mode of channel state information of the corresponding feedback unit, and n is a positive integer; and the beamformee sends a beamforming report to the beamformer, where the beamforming report includes one or more feedback fields, each feedback field corresponds to one feedback unit, the feedback field includes channel state information of the corresponding feedback unit, and the channel state information of the corresponding feedback unit is processed in a processing mode indicated by the processing mode bitmap.

Based on the foregoing technical solution, every n bits in the processing mode bitmap correspond to one feedback unit, and the value of the n bits is used to indicate the processing mode of the channel state information of the corresponding feedback unit. It may be understood that different processing modes correspond to different feedback overheads and different feedback precision. Therefore, for channel state information of some feedback units (for example, relatively important channels), the beamformer may indicate, using the processing mode bitmap, the beamformee to use a processing mode with relatively high feedback precision, to ensure feedback precision. For channel state information of some other feedback units (for example, unimportant channels), the beamformer may indicate, using the processing mode bitmap, the beamformee to use a processing mode with relatively low feedback overheads, to reduce feedback overheads. In this way, the beamformer may configure a proper processing mode based on a requirement, and indicate the beamformee to process channel state information of different feedback units in different processing modes, to implement balance between feedback overheads and feedback precision of the channel state information when the channel state information is fed back.

In a possible design, the feedback unit is a segment, a resource unit, or a channel.

In a possible design, the MAC frame is an NDPA frame or a beamforming report poll trigger frame.

According to a third aspect, a channel state information feedback method is provided, and includes the following steps. A beamformer sends a MAC frame, where the MAC frame includes at least two pieces of user information corresponding to a target beamformee, and at least one type of configuration parameters in configuration parameters included in the at least two pieces of user information have different values; and the beamformer receives a beamforming report sent by the target beamformee, where the beamforming report includes channel state information respectively corresponding to the at least two pieces of user information.

Based on the foregoing technical solution, the MAC frame may include the at least two pieces of user information corresponding to the target beamformee, and the at least one type of configuration parameters in the configuration parameters included in the at least two pieces of user information have different values. To be more specific, the beamformer may indicate, using a plurality of pieces of user information corresponding to the target beamformee in the MAC frame, the target beamformee to feed back a plurality of pieces of channel state information, where the plurality of pieces of channel state information may be processed in different processing modes, and/or the plurality of pieces of channel state information are channel state information of resource units at different parts. In this way, the channel state information is flexibly fed back.

In a possible design, the user information includes one or more of the following configuration parameters: a resource unit start index, a resource unit end index, processing mode indication information, a number of grouping, or codebook information.

In a possible design, the MAC frame is an NDPA frame or a beamforming report poll trigger frame.

According to a fourth aspect, a channel state information feedback method is provided, and includes the following steps. A target beamformee receives a MAC frame sent by a beamformer, where the MAC frame includes at least two pieces of user information corresponding to the target beamformee, and at least one type of configuration parameters in configuration parameters included in the at least two pieces of user information have different values; and the target beamformee sends a beamforming report to the beamformer, where the beamforming report includes channel state information respectively corresponding to the at least two pieces of user information.

Based on the foregoing technical solution, the MAC frame may include the at least two pieces of user information corresponding to the target beamformee, and the at least one type of configuration parameters in the configuration parameters included in the at least two pieces of user information have different values. To be more specific, the beamformer may indicate, using a plurality of pieces of user information corresponding to the target beamformee in the MAC frame, the target beamformee to feed back a plurality of pieces of channel state information, where the plurality of pieces of channel state information may be processed in different processing modes, and/or the plurality of pieces of channel state information are channel state information of resource units at different parts. In this way, the channel state information is flexibly fed back.

In a possible design, the user information includes one or more of the following configuration parameters: a resource unit start index, a resource unit end index, processing mode indication information, a number of grouping, or codebook information.

In a possible design, the MAC frame is an NDPA frame or a beamforming report poll trigger frame.

According to a fifth aspect, a communications apparatus is provided. The communications apparatus is configured to perform the method according to the first aspect or any possible implementation of the first aspect. For example, the communications apparatus includes a unit configured to perform the method according to the first aspect or any possible implementation of the first aspect.

According to a sixth aspect, a communications apparatus is provided. The communications apparatus is configured to perform the method according to the second aspect or any possible implementation of the second aspect. For example, the communications apparatus includes a unit configured to perform the method according to the second aspect or any possible implementation of the second aspect.

According to a seventh aspect, a communications apparatus is provided. The communications apparatus is configured to perform the method according to the third aspect or any possible implementation of the third aspect. For example, the communications apparatus includes a unit configured to perform the method according to the third aspect or any possible implementation of the third aspect.

According to an eighth aspect, a communications apparatus is provided. The communications apparatus is configured to perform the method according to the fourth aspect or any possible implementation of the fourth aspect. For example, the communications apparatus includes a unit configured to perform the method according to the fourth aspect or any possible implementation of the fourth aspect.

According to a ninth aspect, a communications device is provided. The communications device includes a processor and a transceiver, and optionally, further includes a memory. The processor communicates with the transceiver and the memory through an internal connection. The processor is configured to perform the method according to the first aspect or any possible implementation of the first aspect. The transceiver is controlled by the processor, and is configured to perform the method according to the first aspect or any possible implementation of the first aspect. The memory is configured to store instructions. The instructions are invoked by the processor to perform the method according to the first aspect or any possible implementation of the first aspect.

According to a tenth aspect, a communications device is provided. The communications device includes a processor and a transceiver, and optionally, further includes a memory. The processor communicates with the transceiver and the memory through an internal connection. The processor is configured to perform the method according to the second aspect or any possible implementation of the second aspect. The transceiver is controlled by the processor, and is configured to perform the method according to the second aspect or any possible implementation of the second aspect. The memory is configured to store instructions. The instructions are invoked by the processor to perform the method according to the second aspect or any possible implementation of the second aspect.

According to an eleventh aspect, a communications device is provided. The communications device includes a processor and a transceiver, and optionally, further includes a memory. The processor communicates with the transceiver and the memory through an internal connection. The processor is configured to perform the method according to the third aspect or any possible implementation of the third aspect. The transceiver is controlled by the processor, and is configured to perform the method according to the third aspect or any possible implementation of the third aspect. The memory is configured to store instructions. The instructions are invoked by the processor to perform the method according to the third aspect or any possible implementation of the third aspect.

According to a twelfth aspect, a communications device is provided. The communications device includes a processor and a transceiver, and optionally, further includes a memory. The processor communicates with the transceiver and the memory through an internal connection. The processor is configured to perform the method according to the fourth aspect or any possible implementation of the fourth aspect. The transceiver is controlled by the processor, and is configured to perform the method according to the fourth aspect or any possible implementation of the fourth aspect. The memory is configured to store instructions. The instructions are invoked by the processor to perform the method according to the fourth aspect or any possible implementation of the fourth aspect.

According to a thirteenth aspect, a computer-readable storage medium is provided. The computer-readable storage medium is configured to store a computer program. The computer program includes instructions used to perform the method according to the first aspect or any possible implementation of the first aspect.

According to a fourteenth aspect, a computer-readable storage medium is provided. The computer-readable storage medium is configured to store a computer program. The computer program includes instructions used to perform the method according to the second aspect or any possible implementation of the second aspect.

According to a fifteenth aspect, a computer-readable storage medium is provided. The computer-readable storage medium is configured to store a computer program. The computer program includes instructions used to perform the method according to the third aspect or any possible implementation of the third aspect.

According to a sixteenth aspect, a computer-readable storage medium is provided. The computer-readable storage medium is configured to store a computer program. The computer program includes instructions used to perform the method according to the fourth aspect or any possible implementation of the fourth aspect.

According to a seventeenth aspect, a computer program is provided. The computer program includes instructions used to perform the method according to the first aspect or any possible implementation of the first aspect.

According to an eighteenth aspect, a computer program is provided. The computer program includes instructions used to perform the method according to the second aspect or any possible implementation of the second aspect.

According to a nineteenth aspect, a computer program is provided. The computer program includes instructions used to perform the method according to the third aspect or any possible implementation of the third aspect.

According to a twentieth aspect, a computer program is provided. The computer program includes instructions used to perform the method according to the fourth aspect or any possible implementation of the fourth aspect.

According to a twenty-first aspect, a chip is provided. The chip includes a processing circuit and a transceiver pin, and optionally, further includes a memory. The processing circuit communicates with the transceiver pin and the memory through an internal connection. The processing circuit is configured to perform the method according to the first aspect or any possible implementation of the first aspect. The transceiver pin is controlled by the processing circuit, and is configured to perform the method according to the first aspect or any possible implementation of the first aspect. The memory is configured to store instructions. The instructions are invoked by the processing circuit to perform the method according to the first aspect or any possible implementation of the first aspect.

According to a twenty-second aspect, a chip is provided. The chip includes a processing circuit and a transceiver pin, and optionally, further includes a memory. The processing circuit communicates with the transceiver pin and the memory through an internal connection. The processing circuit is configured to perform the method according to the second aspect or any possible implementation of the second aspect. The transceiver pin is controlled by the processing circuit, and is configured to perform the method according to the second aspect or any possible implementation of the second aspect. The memory is configured to store instructions. The instructions are invoked by the processing circuit to perform the method according to the second aspect or any possible implementation of the second aspect.

According to a twenty-third aspect, a chip is provided. The chip includes a processing circuit and a transceiver pin, and optionally, further includes a memory. The processing circuit communicates with the transceiver pin and the memory through an internal connection. The processing circuit is configured to perform the method according to the third aspect or any possible implementation of the third aspect. The transceiver pin is controlled by the processing circuit, and is configured to perform the method according to the third aspect or any possible implementation of the third aspect. The memory is configured to store instructions. The instructions are invoked by the processing circuit to perform the method according to the third aspect or any possible implementation of the third aspect.

According to a twenty-fourth aspect, a chip is provided. The chip includes a processing circuit and a transceiver pin, and optionally, further includes a memory. The processing circuit communicates with the transceiver pin and the memory through an internal connection. The processing circuit is configured to perform the method according to the fourth aspect or any possible implementation of the fourth aspect. The transceiver pin is controlled by the processing circuit, and is configured to perform the method according to the fourth aspect or any possible implementation of the fourth aspect. The memory is configured to store instructions. The instructions are invoked by the processing circuit to perform the method according to the fourth aspect or any possible implementation of the fourth aspect.

For technical effects brought by any implementation in the fifth aspect to the twenty-fourth aspect, refer to the beneficial effects in the corresponding method provided in the foregoing description. Details are not described herein again.

BRIEF DESCRIPTION OF DRAWINGS

FIG. 4 is a schematic structural diagram 1 of a MIMO control field according to an embodiment of this application;

FIG. 5 is a schematic structural diagram 2 of a MIMO control field according to an embodiment of this application;

FIG. 6 is a schematic structural diagram 3 of a MIMO control field according to an embodiment of this application;

FIG. 14 is a schematic structural diagram 4 of a MIMO control field according to an embodiment of this application;

DESCRIPTION OF EMBODIMENTS

The following first briefly describes some concepts.

(1) Feedback Procedure of Channel State Information in an 802.11ax Standard

Currently, feedback procedures of channel state information in the 802.11ax standard are classified into a single-user feedback procedure and a multi-user feedback procedure. The following uses an example in which a beamformer is an access point (AP) and a beamformee is a station (STA) for description.

Figure 1:
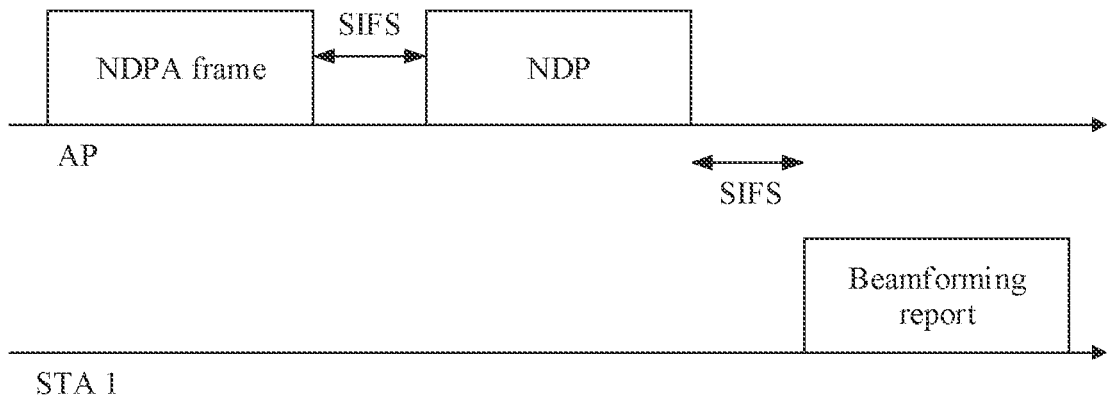
FIG. 1 is a schematic diagram of a single-user feedback procedure of channel state information in an 802.11ax standard.

As shown in FIG. 1, in the single-user feedback procedure, an AP sends an NDPA frame, to indicate a target STA (for example, an STA 1 in FIG. 1) to prepare for channel estimation. Then, the AP sends a null data packet (NDP), such that the target STA performs channel estimation based on a long training sequence in the NDP, to determine channel state information. The target STA sends a beamforming report to the AP, and the beamforming report includes the channel state information.

For example, both an interframe space between the NDPA frame and the NDP and an interframe space between the NDP and the beamforming report are short interframe spaces (SIFS).

Figure 2:
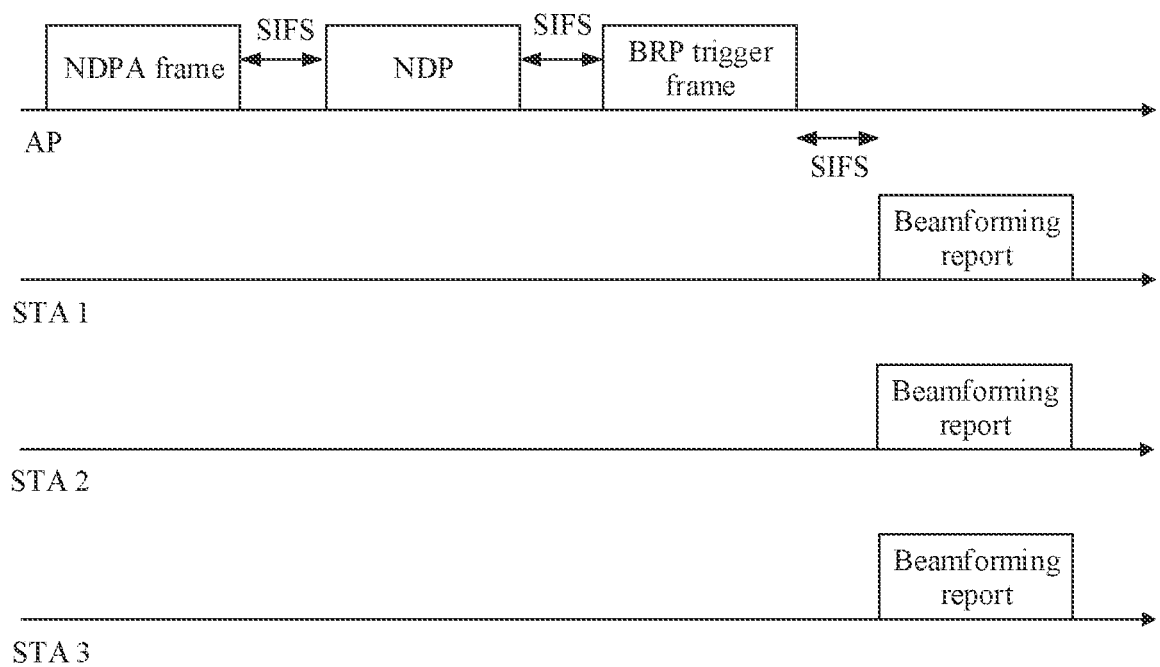
FIG. 2 is a schematic diagram of a multi-user feedback procedure of channel state information in an 802.11ax standard.

As shown in FIG. 2, in the multi-user feedback procedure, an AP sends an NDPA frame, to indicate a plurality of target STAs (such as a STA 1, a STA 2, and a STA 3 in FIG. 2) to prepare for channel estimation. Then, the AP sends an NDP, such that the plurality of target STAs perform channel estimation. The AP sends a beamforming report poll (BRP) trigger frame to trigger the plurality of target STAs to feed back channel state information. The plurality of target STAs each send a beamforming report to the AP.

It should be noted that the NDPA frame, the BRP trigger frame, and the beamforming report are all MAC frames.

(2) Resource Unit (RU)

The resource unit is a frequency domain resource, and the resource unit includes one or more subcarriers. Currently, the following types of RUs are defined in a WLAN system: a 26-subcarrier RU (to be more specific, one RU includes 26 subcarriers), a 52-subcarrier RU (to be more specific, one RU includes 52 subcarriers), a 106-subcarrier RU (to be more specific, one RU includes 106 subcarriers), a 242-subcarrier RU (to be more specific, one RU includes 242 subcarriers), a 484-subcarrier RU (to be more specific, one RU includes 484 subcarriers), a 996-subcarrier RU (to be more specific, one RU includes 996 subcarriers), and the like.

Currently, channel bandwidths (CBWs) supported by the 802.11ax standard are 20 MHz, 40 MHz, 80 MHz, 80+80 MHz (to be more specific, two channels with a bandwidth of 80 MHz are supported, and the two channels are non-contiguous and non-overlapping), and 160 MHz. Table 1 shows a total quantity of RUs in each channel bandwidth.

TABLE 1

| RU type | CBW 20 | CBW 40 | CBW 80 | CBW 160 and CBW 80 + 80 |
|---|---|---|---|---|
| 26-subcarrier RU | 9 | 18 | 37 | 74 |
| 52-subcarrier RU | 4 | 8 | 16 | 32 |
| 106-subcarrier RU | 2 | 4 | 8 | 16 |
| 242-subcarrier RU | 1 | 2 | 4 | 8 |
| 484-subcarrier RU | Not applicable (N/A) | 1 | 2 | 4 |

TABLE 1-continued

| RU type | CBW 20 | CBW 40 | CBW 80 | CBW 160 and CBW 80 + 80 |
|---|---|---|---|---|
| 996-subcarrier RU | N/A | N/A | 1 | 2 |
| 2 × 996-subcarrier RU | N/A | N/A | N/A | 1 |

(3) Segment

The beamforming report may be divided into eight segments. In this case, the channel state information included in the beamforming report is also divided into eight parts, and each segment carries one part of the channel state information.

The following describes the technical solutions in the embodiments of this application with reference to the accompanying drawings in the embodiments of this application. In the descriptions of this application, "/" means "or" unless otherwise specified. For example, A/B may represent A or B. The term "and/or" in this specification describes only an association relationship for describing associated objects and represents that three relationships may exist. For example, A and/or B may represent the following three cases. Only A exists, both A and B exist, and only B exists. In addition, "at least one" means one or more, and "a plurality of" means two or more. Words such as "first" and "second" do not limit a quantity and an execution sequence, and the words such as "first" and "second" do not indicate a definite difference.

The technical solutions of this application are applied to a WLAN. A standard used for the WLAN may be an IEEE 802.11 standard such as an 802.11ac standard, an 802.11ax standard, or a next generation 802.11 standard. The technical solutions of this application are applicable to scenarios such as communication between an AP and a STA, communication between APs, and communication between STAs. In the embodiments of this application, the AP may be used as a beamformer, or may be used as a beamformee. The STA may be used as a beamformer, or may be used as a beamformee. The AP may be a wireless router, a wireless transceiver, a wireless switch, or the like. The STA has different names such as a subscriber unit, an access terminal, a mobile station, a mobile console, a mobile device, a terminal, and user equipment. During actual application, the STA may be a cellular phone, a smartphone, a wireless local loop (WLL), another handheld device that has a wireless local area network communication function, or a computer device.

Figure 3:
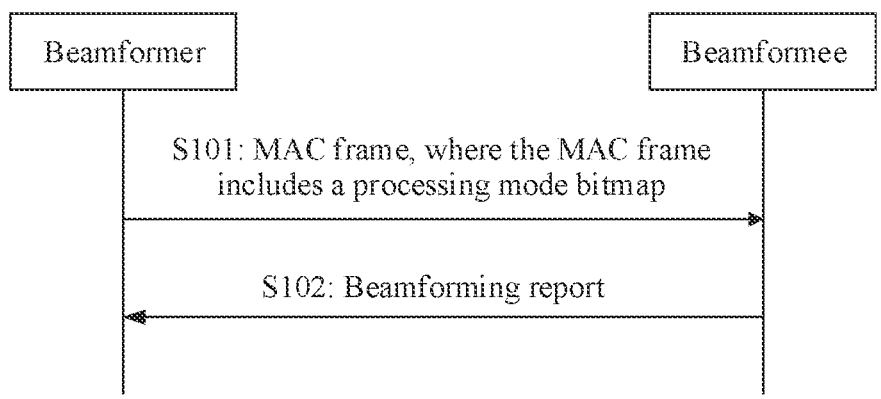
FIG. 3 is a flowchart 1 of a channel state information feedback method according to an embodiment of this application.

FIG. 3 shows a channel state information feedback method according to an embodiment of this application. The method includes the following steps.

S101: A beamformer generates and sends a MAC frame, where the MAC frame includes a processing mode bitmap.

The MAC frame is an NDPA frame or a BRP trigger frame.

In a possible implementation, the beamformer sends the MAC frame in a broadcast manner.

It should be noted that the processing mode bitmap is used to indicate processing modes of channel state information of a plurality of feedback units, and the processing modes of the channel state information of the plurality of feedback units may be the same or different.

In this embodiment of this application, a plurality of different processing modes are pre-specified between the beamformer and a beamformee. Optionally, feedback overheads corresponding to the different processing modes are different. For example, numbers of grouping used in the different processing modes are different, and/or quantization levels used in the different processing modes are different. It should be noted that the number of grouping is used to indicate a quantity of subcarriers that are grouped into one group. It should be noted that, for a group of subcarriers, the beamformee needs to feed back channel state information of only one subcarrier in the group of subcarriers, to reduce feedback overheads.

For example, the foregoing processing modes include a first processing mode and a second processing mode. Feedback overheads corresponding to the first processing mode are higher than feedback overheads corresponding to the second processing mode in one of the following cases. (1) A number of grouping used in the first processing mode is less than a number of grouping used in the second processing mode; (2) a number of grouping used in the first processing mode is greater than the number of grouping used in the second processing mode; and (3) the first processing mode is a non-differential processing mode, and the second processing mode is a differential processing mode. The differential processing mode is to perform difference calculation on current channel state information and previously buffered channel state information, to determine a channel state information difference. In this way, the beamformee feeds back the channel state information difference to the beamformer. The beamformer determines the current channel state information based on the channel state information difference and the previously buffered channel state information. Compared with a channel state information absolute value, the channel state information difference has a smaller variation range. Therefore, fewer quantization bits may be used to represent the channel state information difference, to reduce feedback overheads.

For example, the channel state information includes a feedback matrix (such as a V matrix) and a signal-to-noise ratio (SNR). Optionally, the foregoing processing mode may be a processing mode for one parameter (for example, the feedback matrix or the signal-to-noise ratio) in the channel state information, or may be a processing mode for a plurality of parameters (for example, the feedback matrix and the signal-to-noise ratio) in the channel state information.

In this embodiment of this application, one feedback unit may include at least one segment, at least one RU, or at least one channel. For example, the feedback unit is a 26-subcarrier RU, a 52-subcarrier RU, or a 242-subcarrier RU. For another example, the feedback unit is a channel with a bandwidth of 20 MHz, a channel with a bandwidth of 40 MHz, or a channel with a bandwidth of 80 MHz.

For example, in the processing mode bitmap, every n bits correspond to one feedback unit, a value of the n bits is used to indicate a processing mode of channel state information of the corresponding feedback unit, and n is a positive integer. For example, in the processing mode bitmap, the first to the $n^{th}$ bits correspond to a first feedback unit, the $(n+1)^{th}$ to the $(2n)^{th}$ bits correspond to a second feedback unit, and by analogy, the $(Ln+1)^{th}$ to the $(Ln+n)^{th}$ bits correspond to an $L^{th}$ feedback unit. L is an integer greater than or equal to 0.

In this embodiment of this application, a specific value of n is preconfigured, is defined in a standard, or is indicated by the beamformer. For example, the MAC frame further includes a value indication field, and the value indication field is used to indicate the value of n.

Optionally, there is a correspondence between a value of n and a quantity of processing modes. For example, $2^{n-1} \leq M \leq 2^n$, or $M \leq 2^n$, where M is the quantity of processing modes. For example, if the processing modes include only the first processing mode and the second processing mode, the value of n is 1. In other words, each bit in the processing mode bitmap corresponds to one feedback unit. For another example, if the processing modes include the first processing mode, the second processing mode, and a third processing mode, the value of n is 2. In other words, every two bits in the processing mode bitmap correspond to one feedback unit.

Optionally, a type of the feedback unit corresponding to the n bits in the processing mode bitmap is preconfigured or defined in the standard. To be more specific, whether the n bits in the processing mode bitmap correspond to the 26-subcarrier RU or the 52-subcarrier RU, or correspond to the channel with the bandwidth of 40 MHz is preconfigured or defined in the standard.

Optionally, the type of the feedback unit corresponding to the n bits in the processing mode bitmap is indicated by the beamformer.

In an implementation, the beamformer indicates, in an implicit manner, the type of the feedback unit corresponding to the n bits in the processing mode bitmap. For example, a total quantity of bits included in the processing mode bitmap is used to indicate the type of the feedback unit. For example, if each bit in the processing mode bitmap corresponds to one feedback unit, and the total quantity of bits included in the processing mode bitmap is 8, a type of a feedback unit corresponding to one bit in the processing mode bitmap is a segment, that is, each bit in the processing mode bitmap corresponds to one segment. For another example, it is assumed that a bandwidth of a to-be-detected channel is 320 MHz. If each bit in the processing mode bitmap corresponds to one feedback unit, and the total quantity of bits included in the processing mode bitmap is 8, a type of a feedback unit corresponding to one bit in the processing mode bitmap is a channel with a bandwidth of 40 MHz. For another example, it is assumed that a bandwidth of a to-be-detected channel is 320 MHz. If each bit in the processing mode bitmap corresponds to one feedback unit, and the total quantity of bits included in the processing mode bitmap is 16, a type of a feedback unit corresponding to one bit in the processing mode bitmap is a channel with a bandwidth of 20 MHz. For another example, descriptions are provided with reference to Table 1. It is assumed that a bandwidth of a to-be-detected channel is 160 MHz. If each bit in the processing mode bitmap corresponds to one feedback unit, and the total quantity of bits included in the processing mode bitmap is 16, a type of a feedback unit corresponding to one bit in the processing mode bitmap is a 106-subcarrier RU. For another example, descriptions are provided with reference to Table 1. It is assumed that a bandwidth of a to-be-detected channel is 160 MHz. If each bit in the processing mode bitmap corresponds to one feedback unit, and the total quantity of bits included in the processing mode bitmap is 74, a type of a feedback unit corresponding to one bit in the processing mode bitmap is a 26-subcarrier RU.

It should be noted that the MAC frame may include or not include partial bandwidth information, where the partial bandwidth information is used to indicate a partial channel bandwidth. For example, the partial bandwidth information includes a resource unit start index and a resource unit end index. The resource unit start index and the resource unit end index are used to indicate a segment of contiguous resource units. For example, if the resource unit start index is 0, and the resource unit end index is 10, the resource unit start index and the resource unit end index are used to indicate the first to the eleventh 26-subcarrier RUs. It should be noted that an index of a resource unit is defined in the standard. If the MAC frame does not include the partial bandwidth information, the MAC frame is used to request the beamformee to feed back channel state information in an entire channel bandwidth. If the MAC frame includes the partial bandwidth information, the MAC frame is used to request the beamformee to feed back channel state information in the partial channel bandwidth.

Optionally, the type of the feedback unit corresponding to every n bits in the processing mode bitmap is related to whether the MAC frame includes the partial bandwidth information. For example, the MAC frame does not include the partial bandwidth information, and the entire channel bandwidth is 320 MHz. In this case, if each bit in the processing mode bitmap corresponds to one feedback unit, and the total quantity of bits included in the processing mode bitmap is 16, a type of a feedback unit corresponding to one bit in the processing mode bitmap is a channel with a bandwidth of 20 MHz. For another example, the MAC frame includes the partial bandwidth information, the resource unit start index in the partial bandwidth information is 0, and the resource unit end index in the partial bandwidth information is 15. In this case, if each bit in the processing mode bitmap corresponds to one feedback unit, and the total quantity of bits included in the processing mode bitmap is 16, a type of a feedback unit corresponding to one bit in the processing mode bitmap is a 26-subcarrier RU.

Optionally, if the MAC frame includes the partial bandwidth information, and the feedback unit is an RU, which RU corresponds to every n bits in the processing mode bitmap may be determined with reference to the partial bandwidth information. For example, the MAC frame includes the partial bandwidth information, the resource unit start index in the partial bandwidth information is 7, and the resource unit end index in the partial bandwidth information is 14. In this case, if the total quantity of bits included in the processing mode bitmap is 8, in the processing mode bitmap, the first bit corresponds to the eighth 26-subcarrier RU, the second bit corresponds to the ninth 26-subcarrier RU, and by analogy, the eighth bit corresponds to the fifteenth 26-subcarrier RU.

In another implementation, the beamformer indicates, in an explicit manner, the type of the feedback unit corresponding to the n bits in the processing mode bitmap. For example, the MAC frame also includes a feedback unit indication field, and the feedback unit indication field is used to indicate the type of the feedback unit corresponding to the n bits in the processing mode bitmap.

S102: The beamformer receives a beamforming report sent by the beamformee.

The beamforming report includes one or more feedback fields, each feedback field corresponds to one feedback unit, the feedback field includes channel state information of the corresponding feedback unit, and the channel state information included in the feedback field is processed in a processing mode indicated by the processing mode bitmap.

In an implementation, the beamforming report may further include one or more MIMO control fields, each MIMO control field corresponds to one feedback field, and the MIMO control field is used to indicate a configuration parameter used for channel state information included in the corresponding feedback field.

For example, in this case, for a structure of the beamforming report, refer to Table 2.

An example is used for description with reference to Table 2. In the beamforming report, a MIMO control field 1 is used to indicate a configuration parameter used for channel state information included in a feedback field 1. The channel state information included in the feedback field 1 is the channel state information of the feedback unit corresponding to the first to the $n^{th}$ bits in the processing mode bitmap in step S101, and the channel state information included in the feedback field 1 is processed in a processing mode indicated by a value of the first to the $n^{th}$ bits in the processing mode bitmap. A MIMO control field 2 is used to indicate a configuration parameter used for channel state information included in a feedback field 2. The channel state information included in the feedback field 2 is the channel state information of the feedback unit corresponding to the $(n+1)^{th}$ to the $(2n)^{th}$ bits in the processing mode bitmap in step S101, and the channel state information included in the feedback field 2 is processed in a processing mode indicated by a value of the $(n+1)^{th}$ to the $(2n)^{th}$ bits in the processing mode bitmap.

TABLE 2

| Sequence number | Field |
| --- | --- |
| 0 | Category field |
| 1 | Action field |
| 2 | MIMO control field 1 |
| 3 | Feedback field 1 |
| 4 | MIMO control field 2 |
| 5 | Feedback field 2 |
| ... | ... |

Optionally, when the beamforming report uses the structure shown in Table 2, for the MIMO control field, refer to a structure shown in FIG. 4. As shown in FIG. 4, the MIMO control field includes a number of columns (Nc) index, a number of rows (Nr) index, a channel bandwidth, a number of grouping (Ng), codebook information, a feedback type, a remaining feedback segment, a first feedback segment, a resource unit start index (RU start index), a resource unit end index (RU end index), a sounding dialog token number, and one or more reserved bits.

Alternatively, when the beamforming report uses the structure shown in Table 2, for the MIMO control field, refer to a structure shown in FIG. 5. As shown in FIG. 5, the MIMO control field further includes processing mode indication information. The processing mode indication information is used to indicate a processing mode used for channel state information included in a corresponding feedback field.

In another implementation, the beamforming report includes only one MIMO control field, and the MIMO control field is used to indicate configuration parameters used for channel state information included in all feedback fields in the beamforming report.

For example, in this case, for a structure of the beamforming report, refer to Table 3.

An example is used for description with reference to Table 3. In the beamforming report, the MIMO control field is used to indicate configuration parameters used for channel state information included in a feedback field 1, a feedback field 2, a feedback field 3, and another feedback field (not shown in Table 3). The channel state information included in the feedback field 1 is the channel state information of the feedback unit corresponding to the first to the $n^{th}$ bits in the processing mode bitmap in step S101, and the channel state information included in the feedback field 1 is processed in a processing mode indicated by a value of the first to the $n^{th}$ bits in the processing mode bitmap. The channel state information included in the feedback field 2 is the channel state information of the feedback unit corresponding to the $(n+1)^{th}$ to the $(2n)^{th}$ bits in the processing mode bitmap in step S101, and the channel state information included in the feedback field 2 is processed in a processing mode indicated by a value of the $(n+1)^{th}$ to the $(2n)^{th}$ bits in the processing mode bitmap. The channel state information included in the feedback field 3 is channel state information of a feedback unit corresponding to the $(2n+1)^{th}$ to the $(3n)^{th}$ bits in the processing mode bitmap in step S101, and the channel state information included in the feedback field 3 is processed in a processing mode indicated by a value of the $(2n+1)^{th}$ to the $(3n)^{th}$ bits in the processing mode bitmap.

TABLE 3

| Sequence number | Field |
| --- | --- |
| 0 | Category field |
| 1 | Action field |
| 2 | MIMO control field |
| 3 | Feedback field 1 |
| 4 | Feedback field 2 |
| 5 | Feedback field 3 |
| ... | ... |

Optionally, when the beamforming report uses the structure shown in Table 3, for the MIMO control field, refer to a structure shown in FIG. 4.

Alternatively, when the beamforming report uses the structure shown in Table 3, for the MIMO control field, refer to a structure shown in FIG. 6. As shown in FIG. 6, the MIMO control field further includes a processing mode bitmap. The processing mode bitmap is used to indicate a processing mode used for channel state information included in each feedback field in the beamforming report.

Optionally, as shown in Table 4, the processing mode bitmap may also be used as an independent field in the beamforming report, and have an independent sequence number. This is not limited in this embodiment of this application.

TABLE 4

| Sequence number | Field |
| --- | --- |
| 0 | Category field |
| 1 | Action field |
| 2 | Processing mode bitmap |
| 3 | MIMO control field |
| 4 | Feedback field 1 |
| 5 | Feedback field 2 |
| 6 | Feedback field 3 |
| ... | ... |

Optionally, if the MIMO control field provided in this embodiment of this application is applied to the next generation 802.11 standard, compared with a MIMO control field in the 802.11ax standard, in the MIMO control fields shown in FIG. 4 to FIG. 6, the channel bandwidth, the resource unit start index, and the resource unit end index occupy more bits, such that a higher bandwidth and more RUs can be indicated. In the MIMO control fields shown in FIG. 4 to FIG. 6, the number of columns index and the number of rows index occupy more bits, such that more spatial streams can be indicated.

In addition, it should be noted that in Table 2, Table 3, or Table 4, the category field is used to indicate a category to which the MAC frame belongs. The action field is used to indicate a subcategory to which the MAC frame belongs.

Based on the technical solution shown in FIG. 3, every n bits in the processing mode bitmap correspond to one feedback unit, and the value of the n bits is used to indicate the processing mode of the channel state information of the corresponding feedback unit. It may be understood that different processing modes correspond to different feedback overheads and different feedback precision. Therefore, for channel state information of some feedback units (for example, relatively important channels), the beamformer may indicate, using the processing mode bitmap, the beamformee to use a processing mode with relatively high feedback precision, to ensure feedback precision. For channel state information of some other feedback units (for example, unimportant channels), the beamformer may indicate, using the processing mode bitmap, the beamformee to use a processing mode with relatively low feedback overheads, to reduce feedback overheads. In this way, the beamformee may process channel state information of different feedback units in proper processing modes, to implement balance between feedback overheads and feedback precision of the channel state information when the channel state information is fed back.

The following describes the channel state information feedback method in FIG. 3 with reference to various application scenarios.

Figure 7:
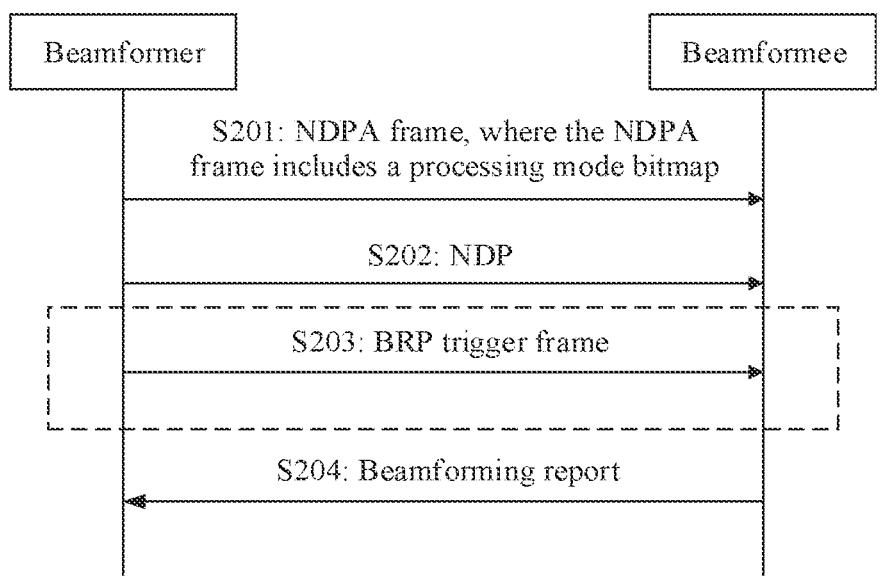
FIG. 7 is a flowchart 2 of a channel state information feedback method according to an embodiment of this application.

FIG. 7 shows a channel state information feedback method according to this application. The method includes the following steps.

S201: A beamformer generates and sends an NDPA frame, where the NDPA frame includes a processing mode bitmap.

Figure 8:
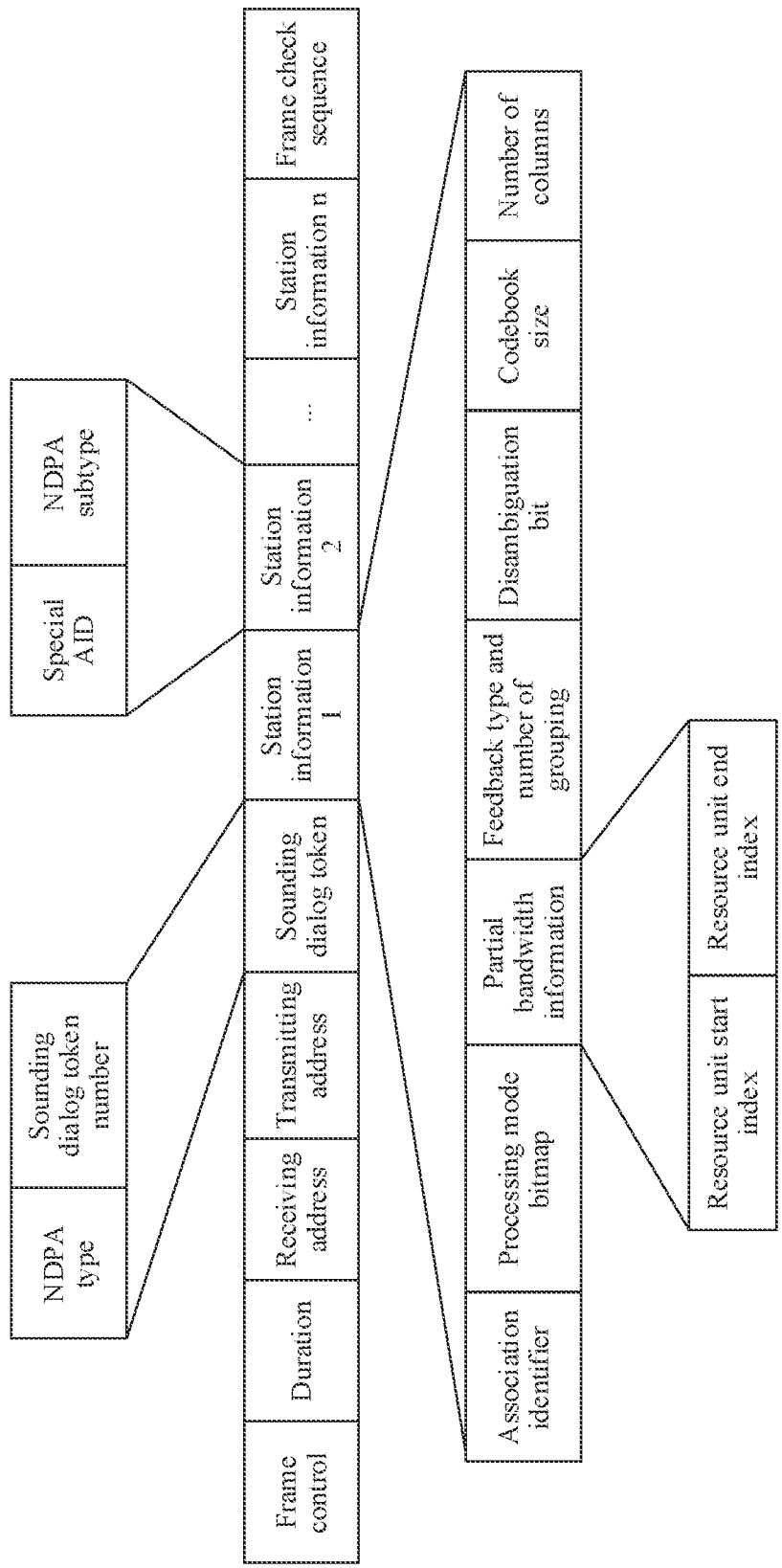
FIG. 8 is a schematic structural diagram 1 of an NDPA frame according to an embodiment of this application.

For example, FIG. 8 is a schematic structural diagram of an NDPA frame according to an embodiment of this application. As shown in FIG. 8, station information in the NDPA frame may include a processing mode bitmap. The processing mode bitmap included in the station information is applicable to only a beamformee corresponding to the station information. It should be noted that in the NDPA frame, processing mode bitmaps included in different station information may be the same, or may be different.

Figure 9:
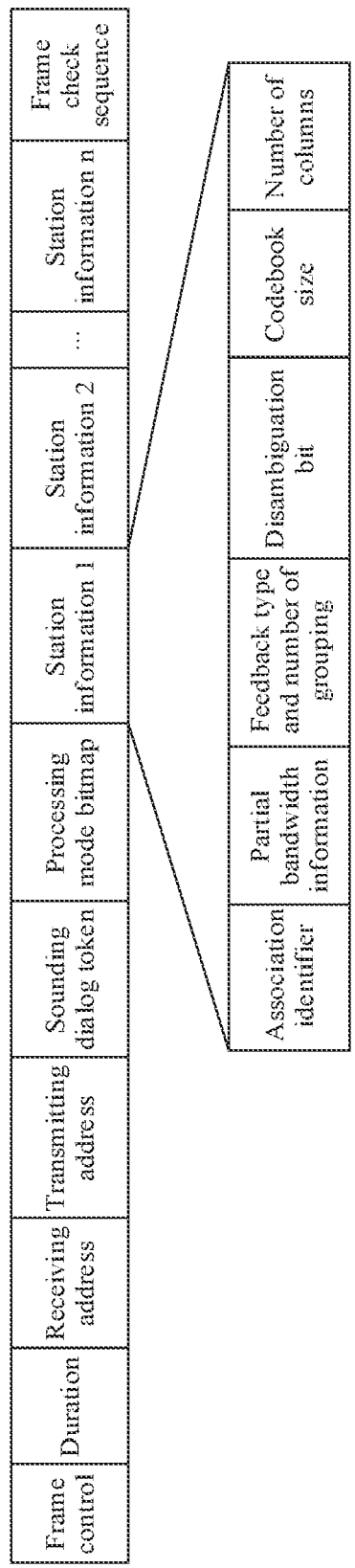
FIG. 9 is a schematic structural diagram 2 of an NDPA frame according to an embodiment of this application.

For example, FIG. 9 is a schematic structural diagram of another NDPA frame according to an embodiment of this application. As shown in FIG. 9, common info of the NDPA frame includes a processing mode bitmap. The processing mode bitmap is applicable to a beamformee corresponding to each piece of station information in the NDPA frame.

It should be noted that, in this embodiment of this application, for detailed descriptions of the processing mode bitmap included in the NDPA frame, refer to step S101. Details are not described again in this embodiment of this application.

With reference to FIG. 8 and FIG. 9, the NDPA frame includes a MAC header, a sounding dialog token field, one or more pieces of station information, and a frame check sequence (FCS) field.

The MAC header includes (1) a frame control field, used to indicate a type of the MAC frame; (2) a duration field, used to indicate duration of occupying a channel by the MAC frame and a corresponding acknowledgment frame; (3) a receiving address (RA) field, used to identify a receive end of the MAC frame; and (4) a transmitting address (TA) field, used to identify a transmit end of the MAC frame.

The station information may further include one or more of the following parameters: an association identifier (AID), partial bandwidth information, a feedback type, an Ng, a disambiguation bit, a codebook size, or a number of columns index. The partial bandwidth information includes a resource unit start index and a resource unit end index.

The frame check sequence field is used to enable the receive end to detect whether a received MAC frame is correct.

Optionally, as shown in FIG. 8, the sounding dialog token field in the NDPA frame includes an NDPA type and a sounding dialog token number. The NDPA type is used to indicate a type of the NDPA frame, that is, indicate that the NDPA frame is a very high throughput (VHT) NDPA frame (that is, an NDPA frame in the 802.11ac standard), a high efficiency (HE) NDPA frame, a ranging NDPA frame, or an EHT NDPA frame. For example, the NDPA type occupies two bits. If a value of the two bits is 00, the NDPA type indicates that the NDPA frame is the VHT NDPA frame. If a value of the two bits is 01, the NDPA type indicates that the NDPA frame is the HE NDPA frame. If a value of the two bits is 10, the NDPA type indicates that the NDPA frame is the ranging NDPA frame. If a value of the two bits is 11, the NDPA type indicates that the NDPA frame is the EHT NDPA frame. The sounding dialog token number is used to identify a sounding dialog.

Optionally, as shown in FIG. 8, in the NDPA frame, if the station information includes a special AID, that is, a value of an AID field in the station information is a special value, for example, 2045, the station information may be used for another function other than a function of requesting the beamformee to feed back channel state information. In this case, another field in the station information is used to indicate other information. Optionally, when the station information is used for the other function, the station information further includes an NDPA subtype, where the NDPA subtype is used to indicate a subtype to which the NDPA frame belongs.

S202: The beamformer sends an NDP.

S203 (optional): The beamformer sends a BRP trigger frame.

During implementation, in a single-user feedback procedure, the beamformer does not perform step S203; and in a multi-user feedback procedure, the beamformer performs step S203.

S204 is the same as step S102. For detailed descriptions, refer to the embodiment shown in FIG. 3. Details are not described herein again.

Figure 10:
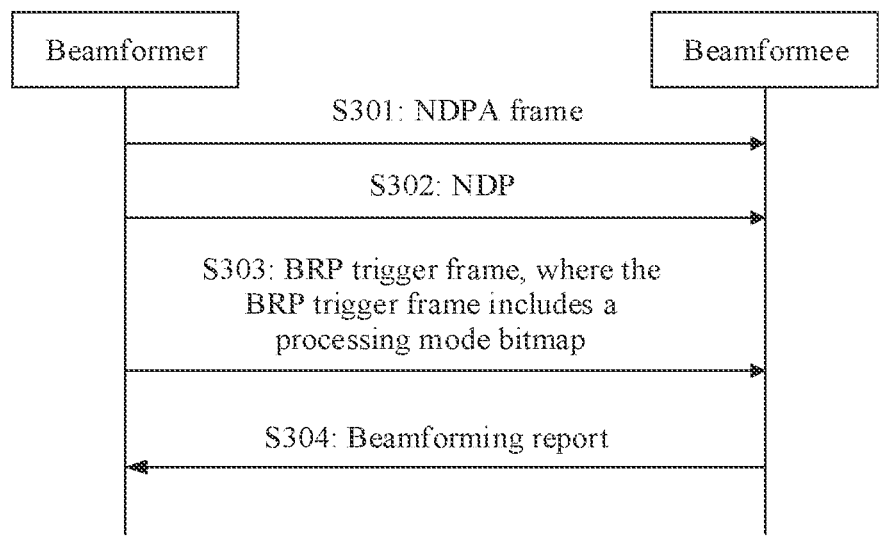
FIG. 10 is a flowchart 3 of a channel state information feedback method according to an embodiment of this application.

FIG. 10 shows a channel state information feedback method according to an embodiment of this application. The method includes the following steps.

S301: A beamformer sends an NDPA frame.

S302: The beamformer sends an NDP.

S303: The beamformer generates and sends a BRP trigger frame, where the BRP trigger frame includes a processing mode bitmap.

Figure 11:
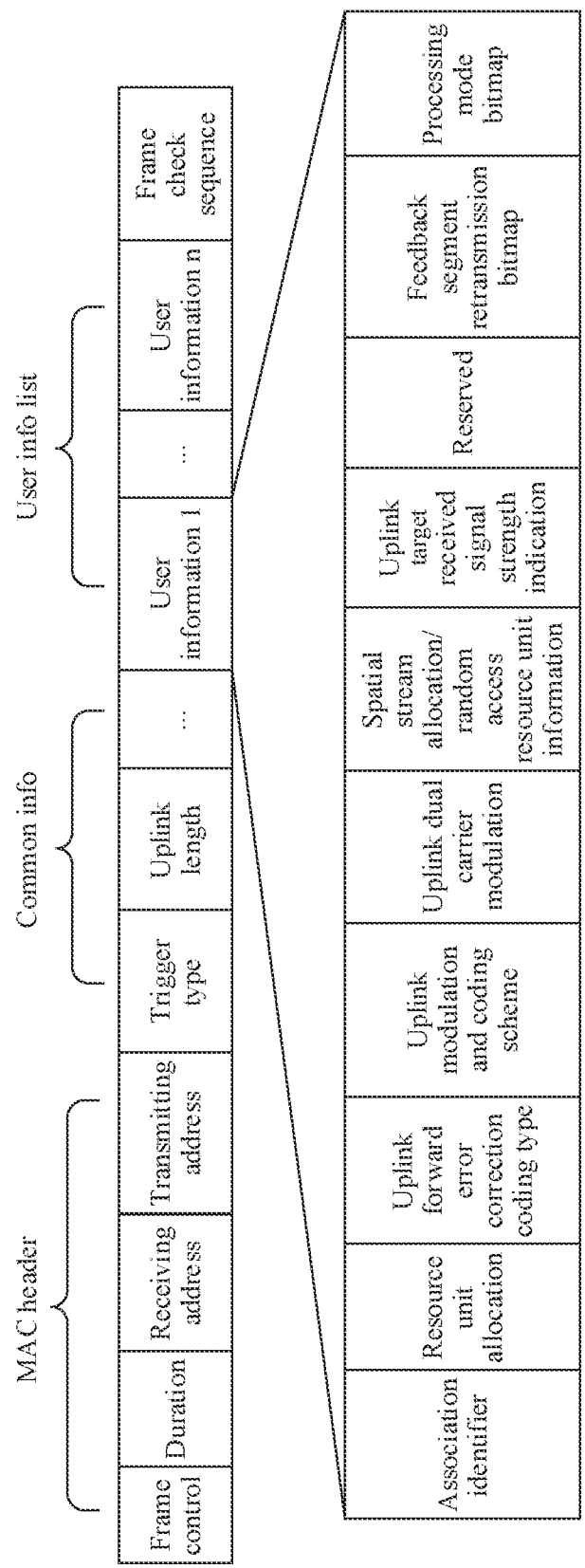
FIG. 11 is a schematic structural diagram 1 of a BRP trigger frame according to an embodiment of this application.

Optionally, FIG. 11 is a schematic structural diagram of a BRP trigger frame according to an embodiment of this application. As shown in FIG. 11, user information of the BRP trigger frame may include a processing mode bitmap. The processing mode bitmap included in the user information is applicable to only a beamformee corresponding to the user information. It should be noted that in the BRP trigger frame, processing mode bitmaps included in different user information may be the same, or may be different.

Figure 12:
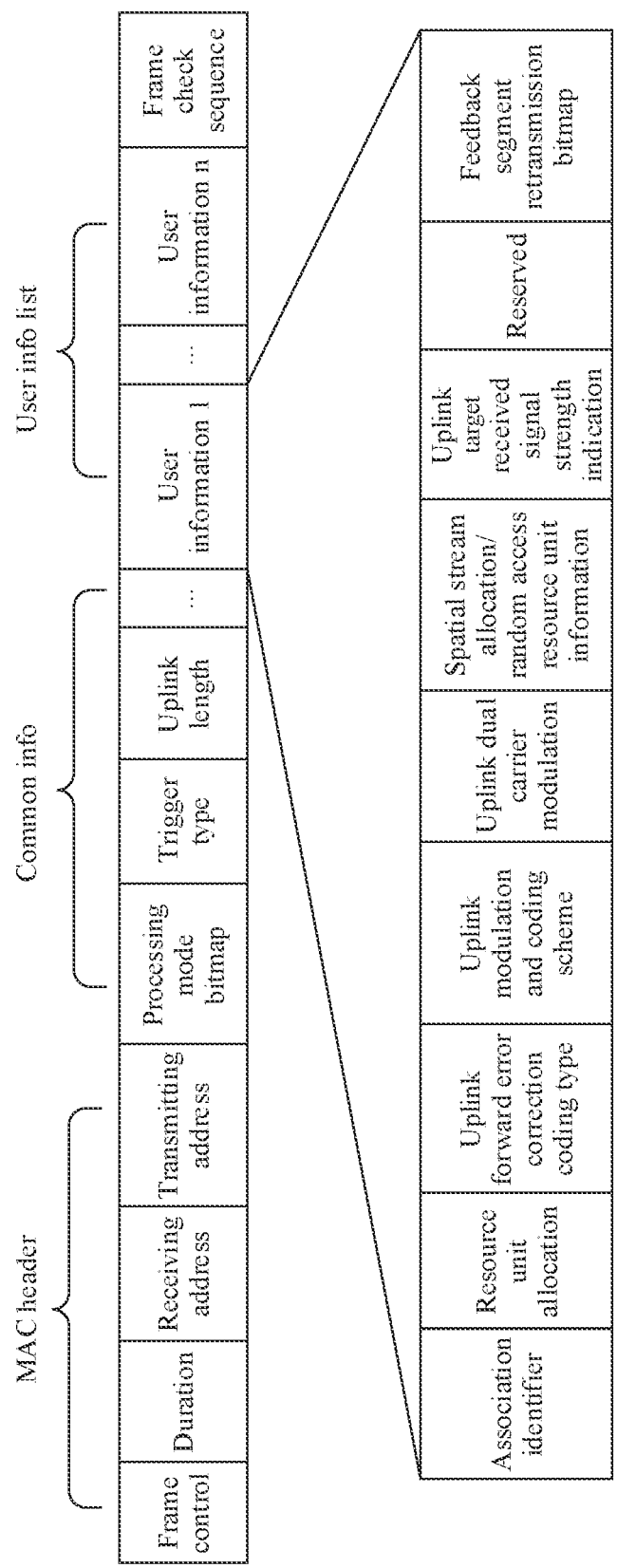
FIG. 12 is a schematic structural diagram 2 of a BRP trigger frame according to an embodiment of this application.

Optionally, FIG. 12 is a schematic structural diagram of a BRP trigger frame according to an embodiment of this application. As shown in FIG. 12, common info of the BRP trigger frame includes a processing mode bitmap. The processing mode bitmap is applicable to a beamformee corresponding to each piece of user information in the BRP trigger frame.

It should be noted that, in this embodiment of this application, for detailed descriptions of the processing mode bitmap included in the BRP trigger frame, refer to step S101. Details are not described again in this embodiment of this application.

With reference to FIG. 11 and FIG. 12, the BRP trigger frame includes a MAC header, common info, a user info list, and an FCS field. The common info includes some common information such as a trigger type and an uplink length. For content, refer to the 802.11 standard. Details are not described herein. The user info list includes one or more pieces of user information. The user information includes one or more of the following parameters: an AID, resource unit allocation (RU allocation), an uplink (UL) forward error correction (FEC) coding type, an UL modulation and coding scheme (MCS), UL dual-carrier modulation (DCM), spatial stream allocation/random access resource unit information, an uplink target received signal strength indication, a feedback segment retransmission bitmap, or one or more reserved bits. For meanings of the foregoing parameters, refer to the 802.11 standard. Details are not described herein.

S304 is the same as step S104. For detailed descriptions, refer to the embodiment shown in FIG. 3. Details are not described herein again.

Figure 13:
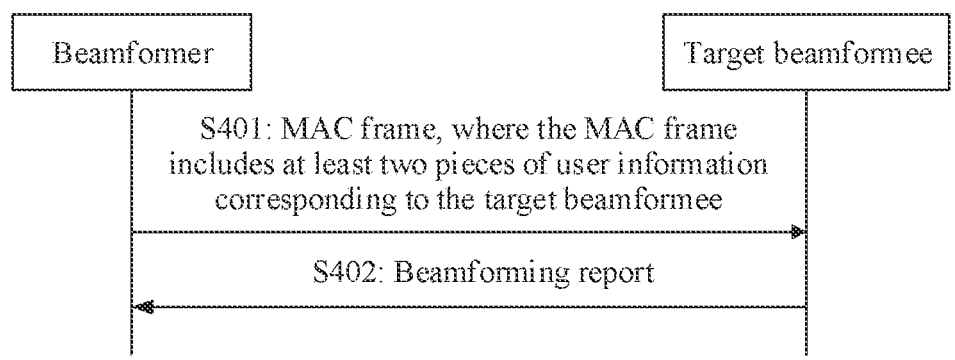
FIG. 13 is a flowchart 4 of a channel state information feedback method according to an embodiment of this application.

FIG. 13 shows a channel state information feedback method according to an embodiment of this application. The method includes the following steps.

S401: A beamformer generates and sends a MAC frame, where the MAC frame includes at least two pieces of user information corresponding to a target beamformee, and at least one type of configuration parameters in configuration parameters included in the at least two pieces of user information have different values.

The user information is used to indicate the corresponding beamformee to feed back channel state information. For example, the configuration parameter included in the user information includes one or more of the following: a resource unit start index, a resource unit end index, processing mode indication information, a number of grouping, or codebook information. The processing mode indication information is used to indicate a processing mode of the channel state information.

The resource unit start index and the resource unit end index are used to indicate the beamformee to feed back channel state information of a resource unit at a specific part. Therefore, if the at least two pieces of user information include different resource unit start indexes and/or different resource unit end indexes, the target beamformee separately feeds back channel state information of resource units at different parts based on the at least two pieces of user information.

The processing mode indication information, the number of grouping, and the codebook information are used to indicate the processing mode of the channel state information. Therefore, if the at least two pieces of user information include different processing mode indication information, different numbers of grouping, and/or different codebook information, the target beamformee uses different processing modes for the channel state information corresponding to the at least two pieces of user information.

Optionally, the MAC frame is an NDPA frame or a BRP trigger frame. It should be noted that, in the NDPA frame, the user information included in the MAC frame is usually referred to as station information.

In an optional implementation, the beamformer sends the MAC frame in a broadcast manner.

S402: The beamformer receives a beamforming report sent by the target beamformee, where the beamforming report includes the channel state information respectively corresponding to the at least two pieces of user information.

Optionally, the beamforming report includes a plurality of feedback fields, each feedback field corresponds to one piece of user information, and the feedback field includes channel state information requested by the corresponding user information.

In an implementation, the beamforming report includes a plurality of MIMO control fields, each MIMO control field corresponds to one feedback field, and the MIMO control field is used to indicate a configuration parameter used for channel state information included in the corresponding feedback field. For example, in this case, for a structure of the beamforming report, refer to Table 2, and for a structure of the MIMO control field, refer to FIG. 4 or FIG. 5.

In another implementation, the beamforming report includes only one MIMO control field, and the MIMO control field is used to indicate configuration parameters used for channel state information included in all feedback fields in the beamforming report. For example, in this case, for a structure of the beamforming report, refer to Table 3, and for the MIMO control field, refer to FIG. 4, FIG. 6, or FIG. 14.

As shown in FIG. 14, the MIMO control field includes quantity indication information, a processing mode bitmap, a number of grouping bitmap, and a codebook information bitmap. The quantity indication information is used to indicate a quantity of feedback fields included in the beamforming report. The processing mode bitmap is used to indicate a processing mode used for channel state information included in each feedback field in the beamforming report. The number of grouping bitmap is used to indicate a number of grouping used for the channel state information included in each feedback field in the beamforming report. The codebook information bitmap is used to indicate codebook information used for the channel state information included in each feedback field in the beamforming report.

In addition, as shown in FIG. 14, the MIMO control field may further include a plurality of pieces of partial bandwidth information, and the partial bandwidth information includes a resource unit start index and a resource unit end index. Each piece of partial bandwidth information corresponds to one feedback field, and the partial bandwidth information is used to indicate that channel state information included in the corresponding feedback field is channel state information of a resource unit at a specific part. Using FIG. 14 as an example, a resource unit start index 1 and a resource unit end index 1 correspond to a feedback field 1, and by analogy, a resource unit start index n and a resource unit end index n correspond to a feedback field n.

Based on the technical solution shown in FIG. 13, the MAC frame may include the at least two pieces of user information corresponding to the target beamformee, and the at least one type of configuration parameters in the configuration parameters included in the at least two pieces of user information have different values. To be more specific, the beamformer may indicate, using a plurality of pieces of user information corresponding to the target beamformee in the MAC frame, the target beamformee to feed back a plurality of pieces of channel state information, where the plurality of pieces of channel state information may be processed in different processing modes, and/or the plurality of pieces of channel state information are channel state information of resource units at different parts. In this way, the channel state information is flexibly fed back.

The following describes the technical solution in FIG. 13 with reference to various application scenarios.

Figure 15:
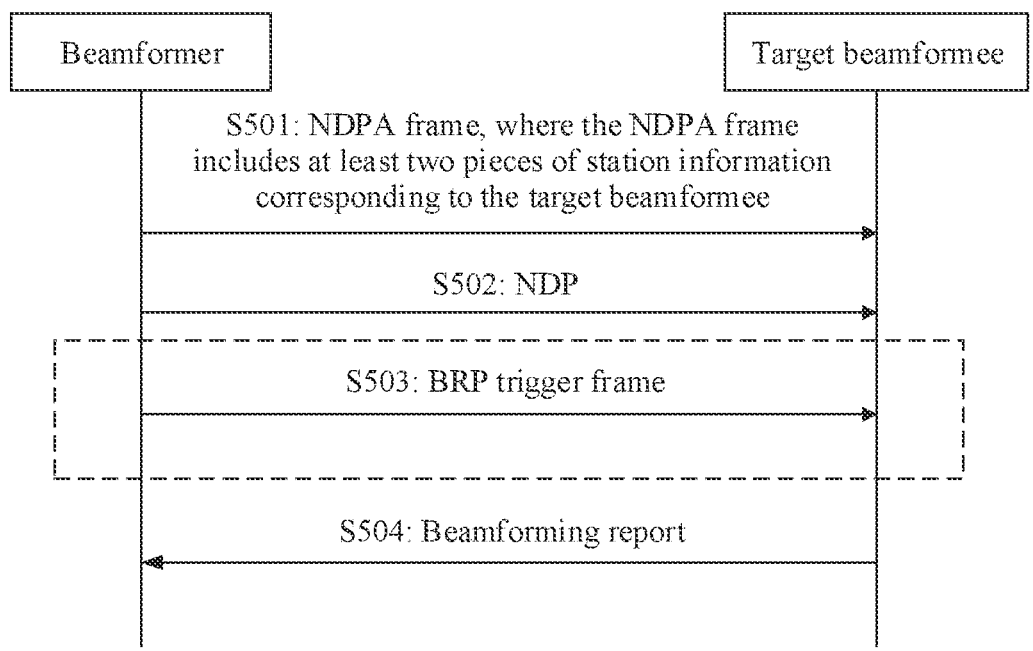
FIG. 15 is a flowchart 5 of a channel state information feedback method according to an embodiment of this application.

FIG. 15 shows a channel state information feedback method according to an embodiment of this application. The method includes the following steps.

S501: A beamformer generates and sends an NDPA frame, where the NDPA frame includes at least two pieces of station information corresponding to a target beamformee, and at least one type of configuration parameters in configuration parameters included in the at least two pieces of station information have different values.

Figure 16:
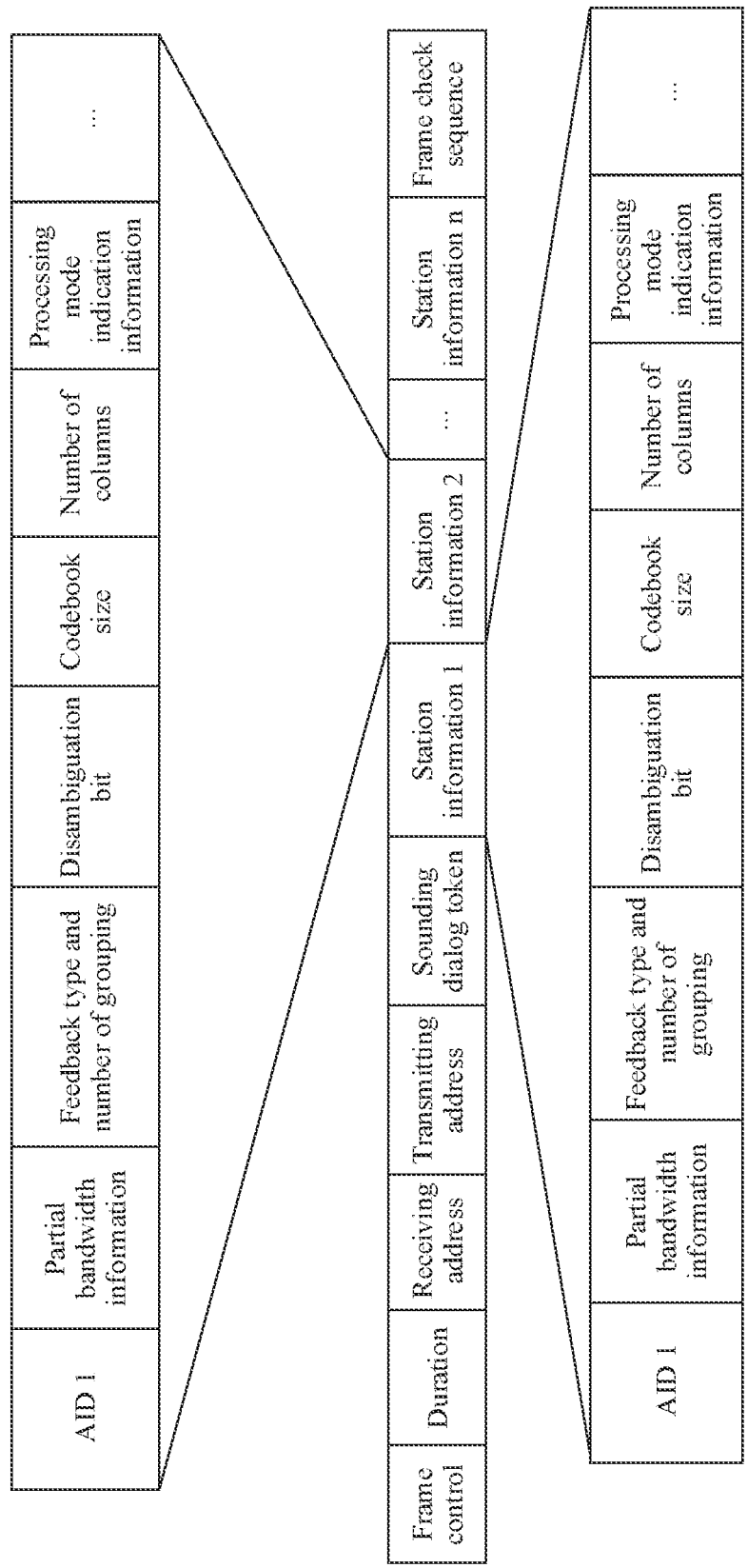
FIG. 16 is a schematic structural diagram 3 of an NDPA frame according to an embodiment of this application.

In an implementation, the NDPA frame includes a plurality of pieces of station information, and at least two of the plurality of pieces of station information have a same AID. It may be understood that the at least two pieces of station information having the same AID correspond to a same beamformee. For example, as shown in FIG. 16, AIDs of station information 1 and station information 2 in the NDPA frame are both an AID 1. In addition, at least one type of configuration parameters in configuration parameters included in the station information 1 and the station information 2 have different values. For example, in the station information 1, a resource unit start index is 0, and a resource unit end index is 8; and in the station information 2, a resource unit start index is 18, and a resource unit end index is 26. In this way, the station information 1 is used to request the beamformee to feed back channel state information of the first to the ninth 26-subcarrier RUs. The station information 2 is used to request the beamformee to feed back channel state information of the nineteenth to the twenty-seventh 26-subcarrier RUs. In other words, the station information 1 and the station information 2 are respectively used to request channel state information of different RUs from the same beamformee. For another example, an Ng indication included in the station information 1 is 4, and an Ng indication included in the station information 2 is 16. In this way, a number of grouping of the channel state information requested by the station information 1 is different from a number of grouping of the channel state information requested by the station information 2.

Optionally, partial bandwidth information included in the station information 1 is different from partial bandwidth information included in the station information 2.

Optionally, in the NDPA frame, locations of a plurality of pieces of station information with a same AID are adjacent. In this way, in a processing of reading the NDPA frame, if the beamformee determines that AIDs included in two pieces of adjacent station information are different, and an AID included in the previous station information in the two pieces of adjacent station information is the same as an AID of the beamformee, the beamformee does not need to continue to read subsequent station information, thereby reducing duration in which the beamformee reads information.

Figure 17:
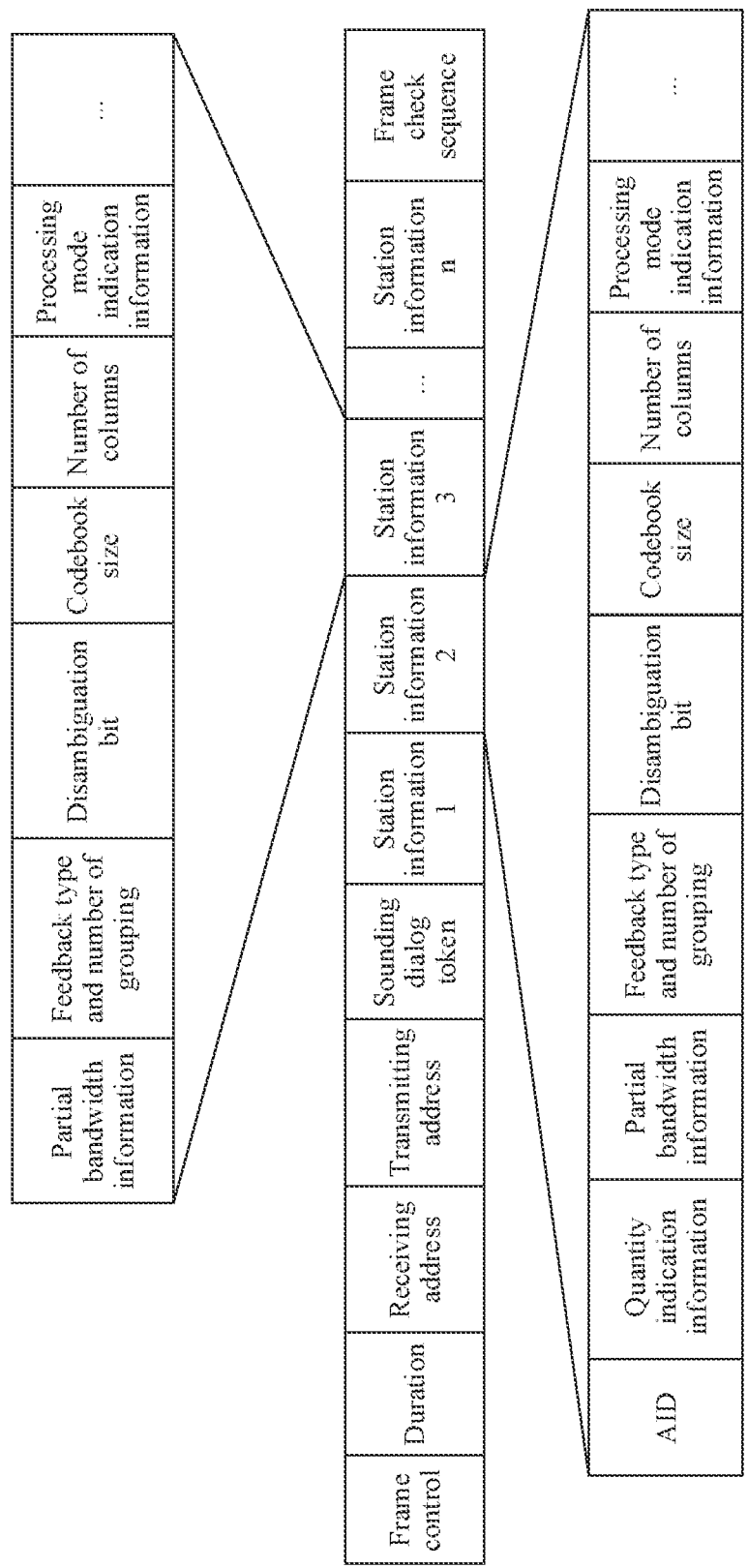
FIG. 17 is a schematic structural diagram 4 of an NDPA frame according to an embodiment of this application.

Further, in the NDPA frame, if the plurality of pieces of adjacent station information have the same AID, an AID field is omitted in station information other than the first piece of station information in the plurality of pieces of station information, to reduce transmission overheads. In addition, quantity indication information is added to the first piece of station information in the plurality of pieces of station information, and the quantity indication information is used to indicate a quantity of pieces of station information with the same AID. With reference to FIG. 17, if station information 2 and station information 3 in an NDPA frame have a same AID, an AID field is removed from the station information 3. In addition, quantity indication information is added to the station information 2, and the quantity indication information is used to indicate that a quantity of pieces of station information with the same AID is 2.

S502: The beamformer sends an NDP.

S503 (optional): The beamformer sends a BRP trigger frame.

During implementation, in a single-user feedback procedure, the beamformer does not perform step S503; and in a multi-user feedback procedure, the beamformer performs step S503.

S504 is the same as step S402. For detailed descriptions, refer to the embodiment shown in FIG. 13. Details are not described herein again.

Figure 18:
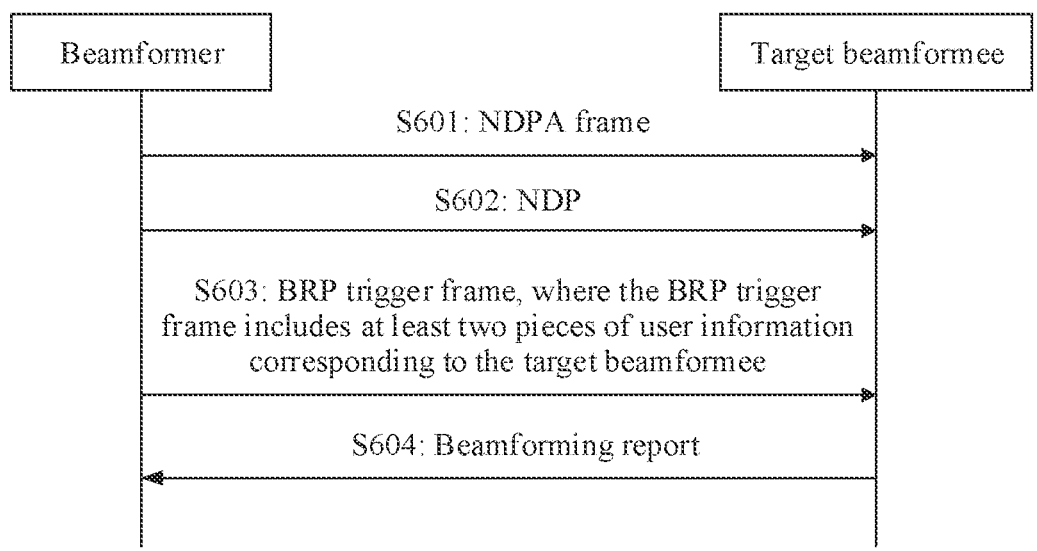
FIG. 18 is a flowchart 6 of a channel state information feedback method according to an embodiment of this application.

FIG. 18 shows another channel state information feedback method according to an embodiment of this application. The method includes the following steps.

S601: A beamformer sends an NDPA frame.

S602: The beamformer sends an NDP.

S603: The beamformer generates and sends a BRP trigger frame, where the BRP trigger frame includes at least two pieces of user information corresponding to a target beamformee, and at least one type of configuration parameters in configuration parameters included in the at least two pieces of user information have different values.

Figure 19:
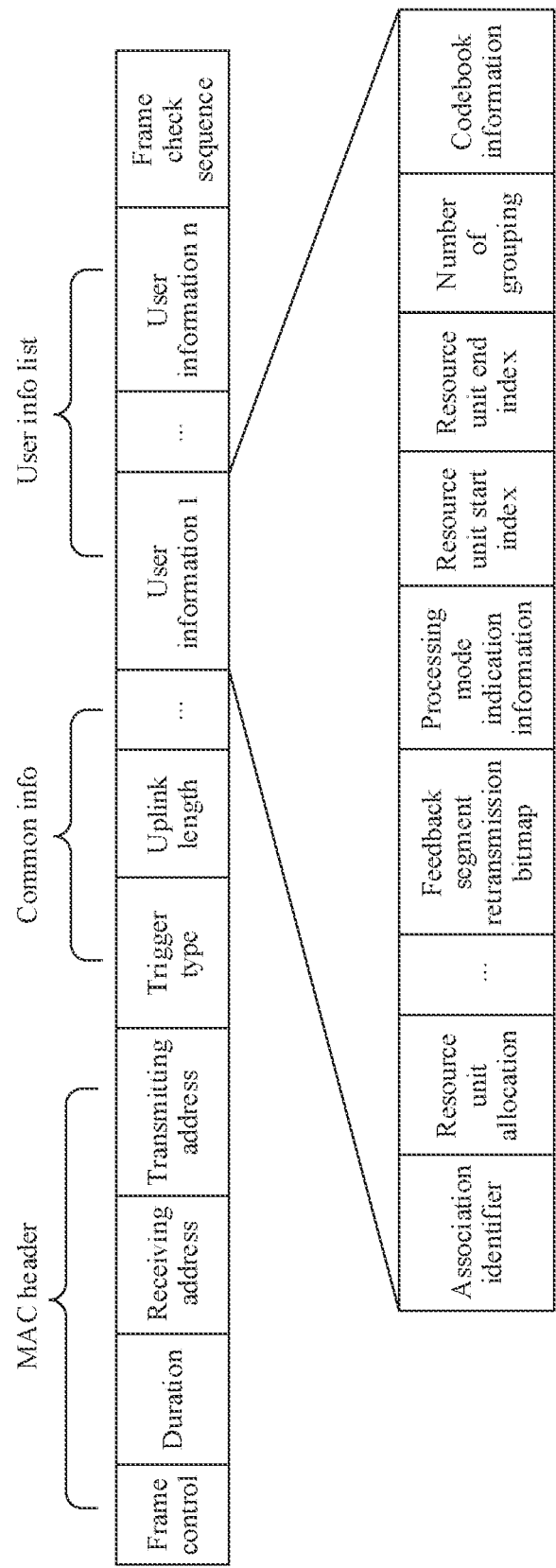
FIG. 19 is a schematic structural diagram 3 of a BRP trigger frame according to an embodiment of this application.

Optionally, FIG. 19 is a schematic structural diagram of a BRP trigger frame according to an embodiment of this application. As shown in FIG. 19, the BRP trigger frame further includes the following parameters: a resource unit start index, a resource unit end index, processing mode indication information, a number of grouping, and codebook information.

Figure 20:
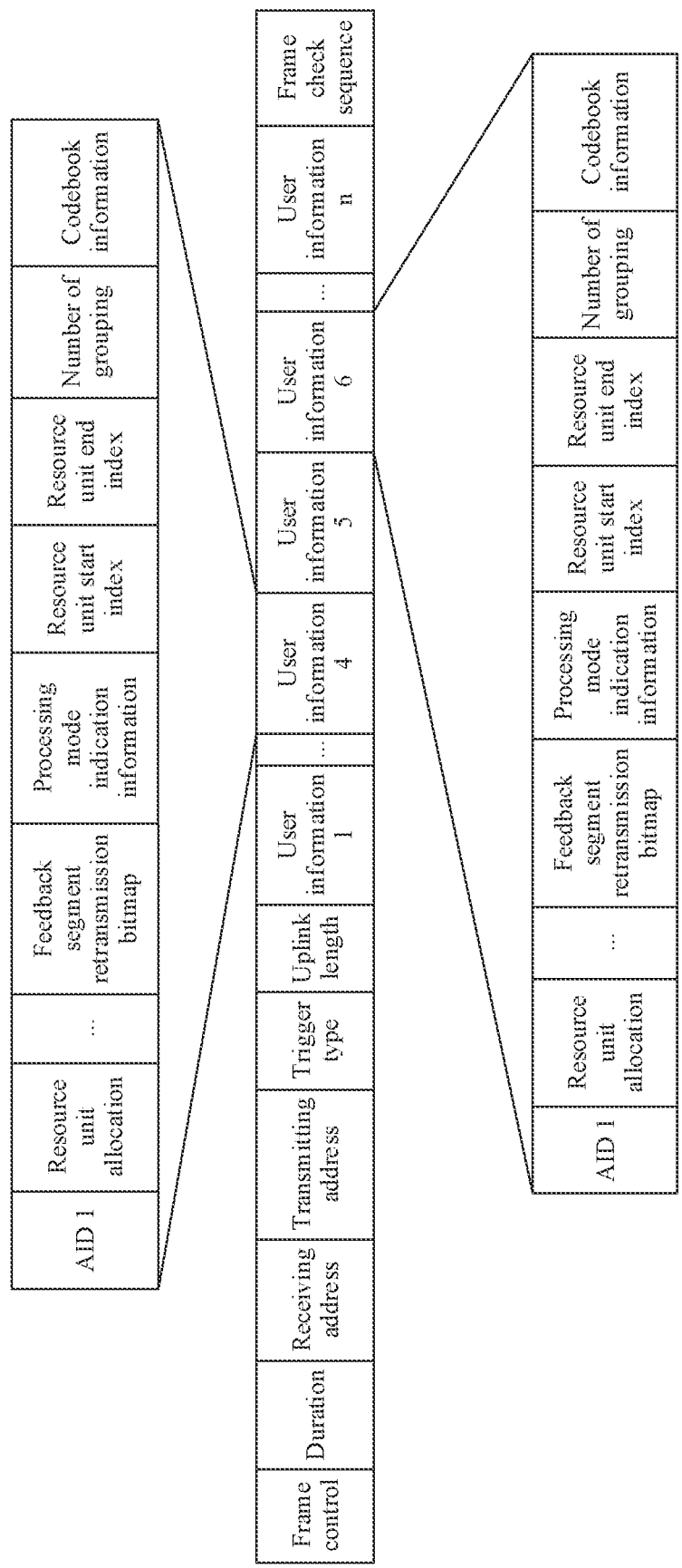
FIG. 20 is a schematic structural diagram 4 of a BRP trigger frame according to an embodiment of this application.

In an implementation, the BRP trigger frame includes a plurality of pieces of user information, and at least two of the plurality of pieces of user information have a same AID. For example, as shown in FIG. 20, in the BRP trigger frame, AIDs in both user information 4 and user information 5 are an AID 1. In addition, at least one type of configuration parameters in configuration parameters included in the user information 4 and the user information 5 have different values. For example, it is assumed that, in the user information 4, a resource unit start index is 6, a resource unit end index is 10, and an Ng indication is 4; and in the user information 5, a resource unit start index is 20, a resource unit end index is 25, and an Ng indication is 8. In this way, the user information 4 is used to request a beamformee corresponding to the AID 1 to feed back channel state information of the seventh to the eleventh 26-subcarrier RUs, and a number of grouping used for the channel state information is 4. The user information 5 is used to request the beamformee corresponding to the AID 1 to feed back channel state information of the twenty-first to the twenty-sixth 26-subcarrier RUs, and a number of grouping used for the channel state information is 8.

Optionally, in the BRP trigger frame, locations of a plurality of pieces of user information with a same AID are adjacent, to reduce duration in which the beamformee reads information.

Figure 21:
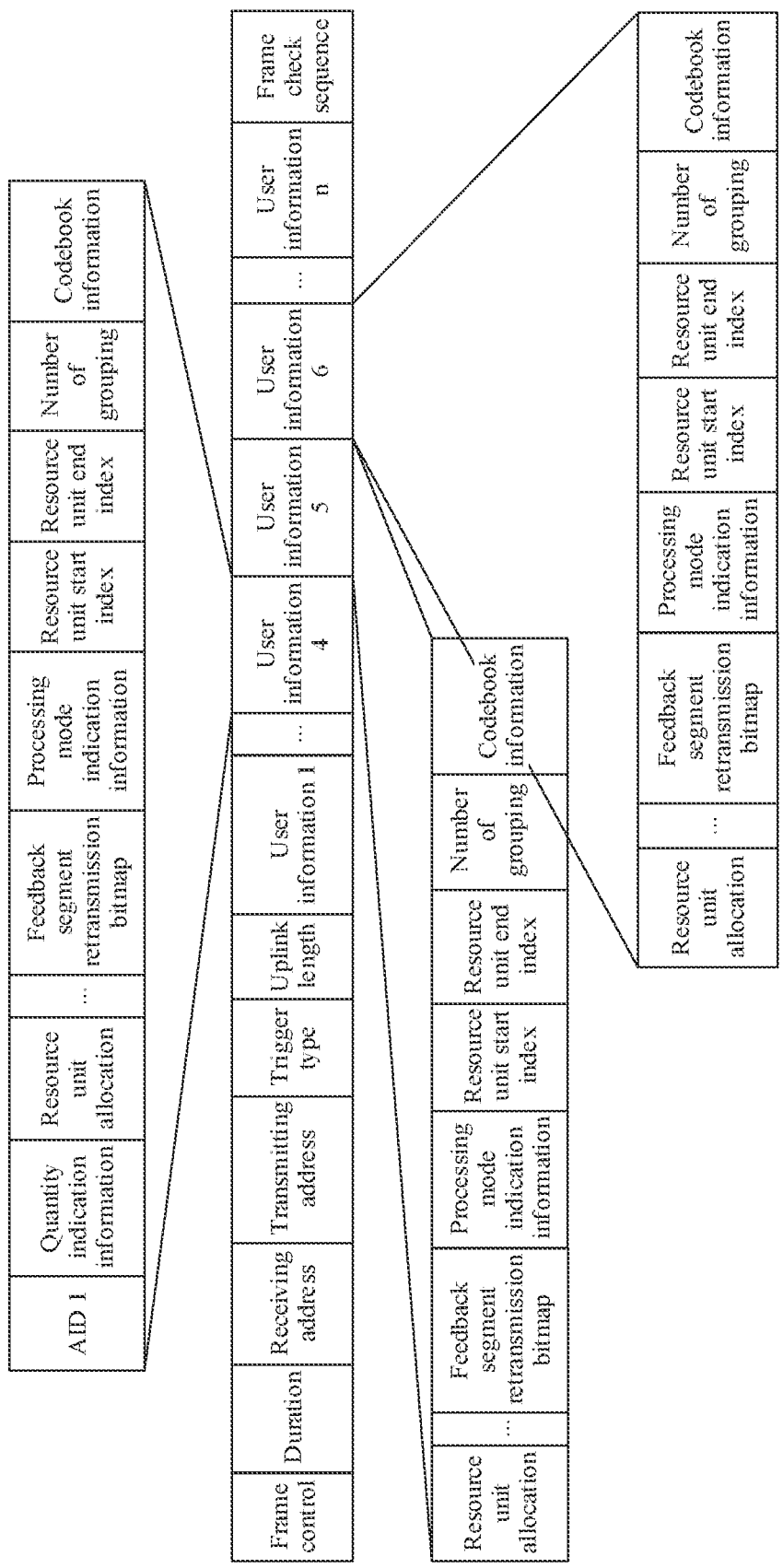
FIG. 21 is a schematic structural diagram 5 of a BRP trigger frame according to an embodiment of this application.

Further, in the BRP trigger frame, if the plurality of pieces of adjacent station information have the same AID, an AID field is omitted in station information other than the first piece of station information in the plurality of pieces of station information, to reduce transmission overheads. In addition, quantity indication information is added to the first piece of station information in the plurality of pieces of station information, and the quantity indication information is used to indicate a quantity of pieces of station information with the same AID. With reference to FIG. 21, if user information 4, user information 5, and user information 6 in the BRP trigger frame have a same AID, an AID field is removed from each of the user information 5 and the user information 6. In addition, quantity indication information is added to the user information 4, and the quantity indication information is used to indicate that a quantity of pieces of user information with the same AID is 3.

S604 is the same as step S402. For detailed descriptions, refer to the embodiment shown in FIG. 13. Details are not described herein again.

The foregoing mainly describes the solutions provided in the embodiments of this application from a perspective of interaction between network elements. It may be understood that, to implement the foregoing functions, each network element, for example, the beamformer and the beamformee, includes corresponding hardware structures and/or software modules for performing the functions. A person skilled in the art should easily be aware that, in combination with units and algorithm steps of the examples described in the embodiments disclosed in this specification, this application may be implemented in a hardware form or in a form of combining hardware with computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the apparatus may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in the embodiments of this application, division into modules is an example, and is merely logical function division. During actual implementation, another division manner may be used. An example in which each function module is obtained through division based on each corresponding function is used below for description.

Figure 22:
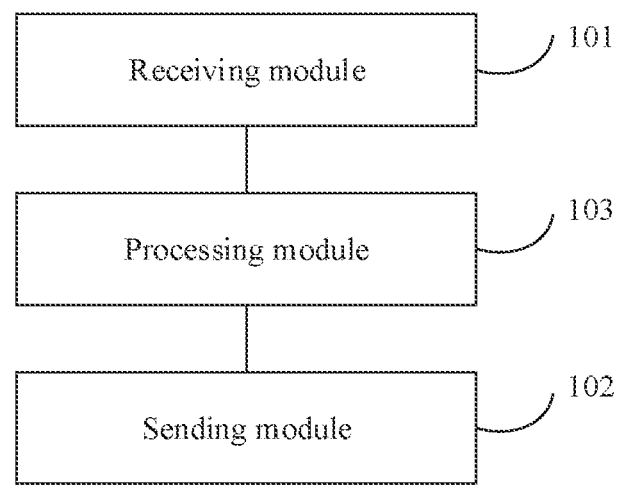
FIG. 22 is a schematic structural diagram of a communications apparatus according to an embodiment of this application.

FIG. 22 is a schematic structural diagram of a communications apparatus according to an embodiment of this application. As shown in FIG. 22, the communications apparatus includes a receiving module 101, a sending module 102, and a processing module 103.

In an implementation, if the communications apparatus is used as a beamformer, the processing module 103 is configured to generate a MAC frame. The MAC frame includes a processing mode bitmap, every n bits in the processing mode bitmap correspond to one feedback unit, a value of the n bits is used to indicate a processing mode of channel state information of the corresponding feedback unit, and n is a positive integer. The sending module 102 is configured to send the MAC frame generated by the processing module 103. The receiving module 101 is configured to receive a beamforming report sent by a beamformee. The beamforming report includes one or more feedback fields, each feedback field corresponds to one feedback unit, the feedback field includes channel state information of the corresponding feedback unit, and the channel state information included in the feedback field is processed in a processing mode indicated by the processing mode bitmap.

Optionally, the feedback unit is a segment, a resource unit, or a channel.

Optionally, the MAC frame is an NDPA frame or a beamforming report poll trigger frame.

In an implementation, if the communications apparatus is used as a beamformee, the receiving module 101 is configured to receive a MAC frame. The MAC frame includes a processing mode bitmap, every n bits in the processing mode bitmap correspond to one feedback unit, a value of the n bits is used to indicate a processing mode of channel state information of the corresponding feedback unit, and n is a positive integer. The processing module 103 is configured to generate a beamforming report. The beamforming report includes one or more feedback fields, each feedback field corresponds to one feedback unit, the feedback field includes channel state information of the corresponding feedback unit, and the channel state information included in the feedback field is processed in a processing mode indicated by the processing mode bitmap. The sending module 102 is configured to send the beamforming report to a beamformer.

Optionally, the feedback unit is a segment, a resource unit, or a channel.

Optionally, the MAC frame is an NDPA frame or a beamforming report poll trigger frame.

In another implementation, if the communications apparatus is used as a beamformer, the processing module 103 is configured to generate a MAC frame. The MAC frame includes at least two pieces of user information corresponding to a target beamformee, and at least one type of configuration parameters in configuration parameters included in the at least two pieces of user information have different values. The sending module 102 is configured to send the MAC frame generated by the processing module 103. The receiving module 101 is configured to receive a beamforming report sent by the target beamformee. The beamforming report includes channel state information respectively corresponding to the at least two pieces of user information.

Optionally, the user information includes one or more of the following configuration parameters: a resource unit start index, a resource unit end index, processing mode indication information, a number of grouping, or codebook information.

Optionally, the MAC frame is an NDPA frame or a beamforming report poll trigger frame.

In another implementation, if the communications apparatus is used as a target beamformee, the receiving module 101 is configured to receive a MAC frame. The MAC frame includes at least two pieces of user information corresponding to the target beamformee, and at least one type of configuration parameters in configuration parameters included in the at least two pieces of user information have different values. The processing module 103 is configured to generate a beamforming report. The beamforming report includes channel state information respectively corresponding to the at least two pieces of user information. The sending module 102 is configured to send the beamforming report to a beamformer.

With reference to FIG. 3, FIG. 7, FIG. 10, FIG. 13, FIG. 15, and FIG. 18, if the communications apparatus is used as a beamformer, the receiving module 101 is configured to perform step S102 in FIG. 3, step S204 in FIG. 7, step S304 in FIG. 10, step S402 in FIG. 13, step S504 in FIG. 15, step S604 in FIG. 18, and/or another process used for the technical solutions described in this specification. The sending module 102 is configured to perform step S101 in FIG. 3, steps S201 to S203 in FIG. 7, steps S301 to S303 in FIG. 10, step S401 in FIG. 13, steps S501 to S503 in FIG. 15, steps S601 to S603 in FIG. 18, and/or another process used for the technical solutions described in this specification.

If the communications apparatus is used as a beamformee, the receiving module 101 is configured to perform step S101 in FIG. 3, steps S201 to S203 in FIG. 7, steps S301 to S303 in FIG. 10, step S401 in FIG. 13, steps S501 to S503 in FIG. 15, steps S601 to S603 in FIG. 18, and/or another process used for the technical solutions described in this specification. The sending module 102 is configured to perform step S102 in FIG. 3, step S204 in FIG. 7, step S304 in FIG. 10, step S402 in FIG. 13, step S504 in FIG. 15, step S604 in FIG. 18, and/or another process used for the technical solutions described in this specification. All related content of the steps in the foregoing method embodiments may be cited in function descriptions of the corresponding function modules. Details are not described herein again.

The communications apparatus provided in the embodiments of this application may be implemented in a plurality of product forms. For example, the communications apparatus may be configured as a general-purpose processing system. For another example, the communications apparatus may be implemented using a general bus architecture. For another example, the communications apparatus may be implemented by an application-specific integrated circuit (ASIC). The following provides several possible product forms of the communications apparatus in the embodiments of this application. It should be understood that the following product forms are merely examples, and do not limit the possible product forms of the communications apparatus in the embodiments of this application.

Figure 23:
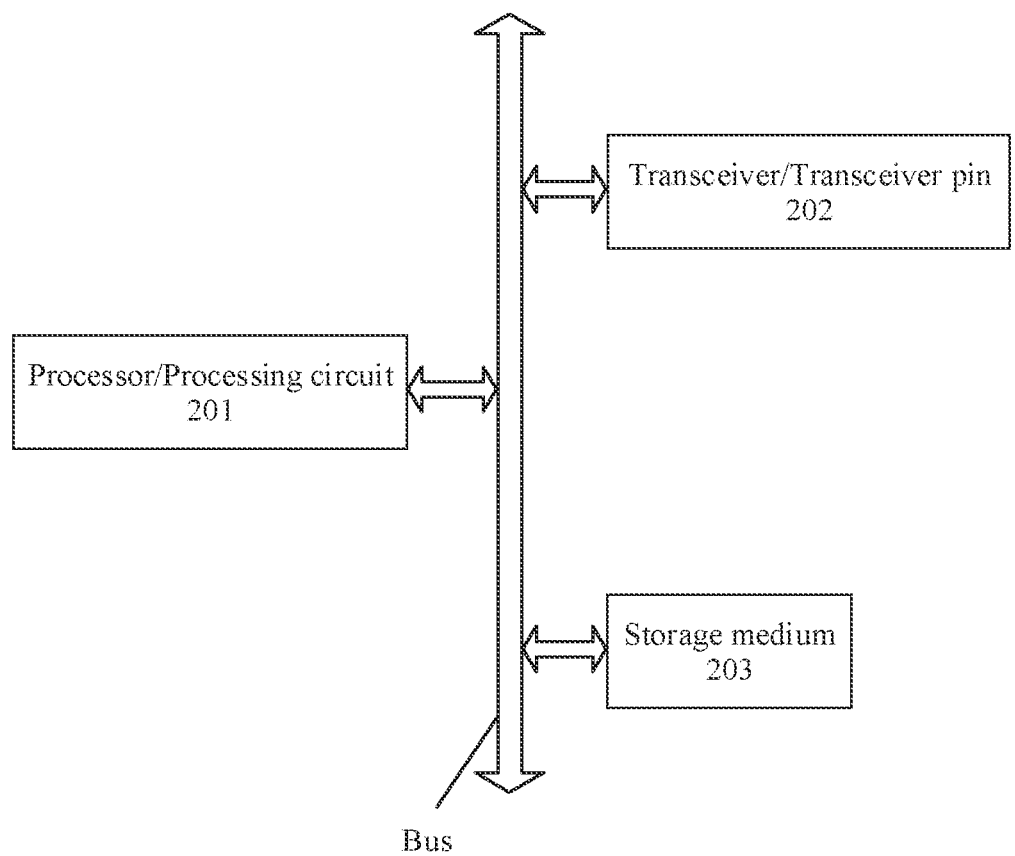
FIG. 23 is a schematic structural diagram of a communications device according to an embodiment of this application.

FIG. 23 is a structural diagram of a possible product form of a communications apparatus according to an embodiment of this application.

In a possible product form, the communications apparatus in this embodiment of this application may be a communications device, and the communications device includes a processor 201 and a transceiver 202. Optionally, the communications device further includes a storage medium 203. The processor 201 is configured to perform the channel state information feedback methods shown in FIG. 3, FIG. 7, FIG. 10, FIG. 13, FIG. 15, and FIG. 18. The transceiver 202 is controlled by the processor 201, and is configured to perform the channel state information feedback methods shown in FIG. 3, FIG. 7, FIG. 10, FIG. 13, FIG. 15, and FIG. 18.

In another possible product form, the communications apparatus in this embodiment of this application may be alternatively implemented by a general-purpose processor, that is, implemented by a commonly known chip. The general-purpose processor includes a processing circuit 201 and a transceiver pin 202. Optionally, the general-purpose processor may further include a storage medium 203. The processing circuit 201 is configured to perform the channel state information feedback methods shown in FIG. 3, FIG. 7, FIG. 10, FIG. 13, FIG. 15, and FIG. 18. The transceiver pin 202 is controlled by the processing circuit 201, and is configured to perform the channel state information feedback methods shown in FIG. 3, FIG. 7, FIG. 10, FIG. 13, FIG. 15, and FIG. 18.

In another possible product form, the communications apparatus in this embodiment of this application may be alternatively implemented using the following circuits or components: one or more field programmable gate arrays (FPGA), a programmable logic device (PLD), a controller, a state machine, gate logic, a discrete hardware component, any other suitable circuit, or any combination of circuits that can perform various functions described in this application.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of plurality. A single processor or another unit may implement several functions enumerated in the claims. Some measures are recorded in dependent claims that are different from each other, but this does not mean that these measures cannot be combined to produce a better effect.

Although this application is described with reference to example features and the embodiments thereof, it is clear that various modifications and combinations may be made to this application without departing from the spirit and scope of this application. Correspondingly, the specification and accompanying drawings are merely example descriptions of this application defined by the appended claims, and are considered as any of or all modifications, variations, combinations, or equivalents that cover the scope of this application. It is clear that, a person skilled in the art can make various modifications and variations to this application without departing from the spirit and scope of this application. This application is intended to cover these modifications and variations of this application provided that they fall within the scope of the claims of this application and their equivalent technologies.

The invention claimed is:

1. A channel state information feedback method implemented by a beamformer and comprising:
    generating a null data packet announcement (NDPA) frame, wherein the NDPA frame comprises:
        a sounding dialog token field comprising an NDPA type that indicates a type of the NDPA frame, and wherein the NDPA type comprises two bits that are set to 00 to indicate that the NDPA frame is a very high throughput (VHT) NDPA frame, to 01 to indicate that the NDPA frame is a high efficiency (HE) NDPA frame, to 10 to indicate that the NDPA frame is a ranging NDPA frame, or to 11 to indicate that that the NDPA frame is an extremely high throughput (EHT) NDPA frame; and
        one or more pieces of station information comprising a processing mode bitmap that indicates processing modes of channel state information of respective feedback elements; and
    sending the NDPA frame.

2. The channel state information feedback method according to claim 1, wherein the sounding dialog token field further comprises a sounding dialog token number that identifies a sounding dialog.

3. The channel state information feedback method according to claim 1, wherein the NDPA frame is a media access control (MAC) frame and further comprises a MAC header, one or more pieces of station information, and a frame check sequence (FCS) field.

4. The channel state information feedback method according to claim 3, wherein the MAC header comprises a frame control field that indicates a type of the MAC frame, a duration field that indicates a duration of occupying a channel by the MAC frame and a corresponding acknowledgment frame, a receiving address (RA) field that identifies a receive end of the MAC frame, and a transmitting address (TA) field that identifies a transmit end of the MAC frame.

5. The channel state information feedback method according to claim 3, wherein the one or more pieces of station information comprise the processing mode bitmap, applicable to a beamformee corresponding to the station information.

6. The channel state information feedback method according to claim 5, wherein the processing mode bitmap comprises bits, wherein every n bits of the bits correspond to a feedback element, wherein a value of the n bits indicates a processing mode of channel state information of the corresponding feedback element, wherein n is a positive integer, and wherein the feedback element is a segment, a resource, or a channel.

7. A channel state information feedback method implemented by a beamformee and comprising:
  receiving a null data packet announcement (NDPA) frame, wherein the NDPA frame comprises:
    a sounding dialog token field comprising an NDPA type that indicates a type of the NDPA frame, and wherein the NDPA type occupies two bits in a portion of the sounding dialog token field that are set to 00 to indicate that the NDPA frame is a very high throughput (VHT) NDPA frame, to 01 that indicates that the NDPA frame is a high efficiency (HE) NDPA frame, to 10 to indicate that the NDPA frame is a ranging NDPA frame, or to 11 to indicate that the NDPA frame is an extremely high throughput (EHT) NDPA frame; and
    one or more pieces of station information comprising a processing mode bitmap that indicates processing modes of channel state information of respective feedback elements; and
  determining the type of the NDPA frame.

8. The channel state information feedback method according to claim 7, further comprising determining a sounding dialog based on a sounding dialog token number in the sounding dialog token field.

9. The channel state information feedback method according to claim 7, wherein the NDPA frame is a media access control (MAC) frame and further comprises a MAC header, one or more pieces of station information, and a frame check sequence (FCS) field.

10. The channel state information feedback method according to claim 9, wherein the MAC header comprises a frame control field that indicates a type of the MAC frame, a duration field that indicates a duration of occupying a channel by the MAC frame and a corresponding acknowledgment frame, a receiving address (RA) field that identifies a receive end of the MAC frame, and a transmitting address (TA) field that identifies a transmit end of the MAC frame.

11. The channel state information feedback method according to claim 9, wherein the one or more pieces of station information comprise the processing mode bitmap applicable to the beamformee corresponding to the station information.

12. The channel state information feedback method according to claim 11, wherein the processing mode bitmap comprises bits, wherein every n bits of the bits correspond to a feedback element, wherein a value of the n bits indicates a processing mode of channel state information of the corresponding feedback element, wherein n is a positive integer, and wherein the feedback element is a segment, a resource, or a channel.

13. An apparatus for channel state information feedback comprising:
  a processor to generate a null data packet announcement (NDPA) frame, wherein the NDPA frame comprises:
    a sounding dialog token field comprising an NDPA type that indicates a type of the NDPA frame, and wherein the NDPA type comprises two bits that are set to 00 to indicate that the NDPA frame is a very high throughput (VHT) NDPA frame, to 01 to indicate that the NDPA frame is a high efficiency (HE) NDPA frame, to 10 to indicate that the NDPA frame is a ranging NDPA frame, or to 11 to indicate that that the NDPA frame is an extremely high throughput (EHT) NDPA frame; and
    one or more pieces of station information comprising a processing mode bitmap that indicates processing modes of channel state information of respective feedback elements; and
  a transceiver coupled to the processor and configured to send the NDPA frame.

14. The apparatus according to claim 13, wherein the sounding dialog token field further comprises a sounding dialog token number that identifies a sounding dialog.

15. The apparatus according to claim 13, wherein the NDPA frame is a media access control (MAC) frame and further comprises a MAC header, one or more pieces of station information, and a frame check sequence (FCS) field, and wherein the MAC header comprises a frame control field that indicates a type of the MAC frame, a duration field that indicates a duration of occupying a channel by the MAC frame and a corresponding acknowledgment frame, a receiving address (RA) field, that identifies a receive end of the MAC frame, and a transmitting address (TA) field that identifies a transmit end of the MAC frame.

16. The apparatus according to claim 15, wherein the one or more pieces of station information comprise the processing mode bitmap, applicable to a beamformee corresponding to the station information, wherein the processing mode bitmap comprises bits, wherein every n bits of the bits correspond to a feedback element, wherein a value of the n bits indicates a processing mode of channel state information of the corresponding feedback element, wherein n is a positive integer, and wherein the feedback element is a segment, a resource, or a channel.

17. An apparatus for channel state information feedback comprising:
  a transceiver configured to receive a null data packet announcement (NDPA) frame, wherein the NDPA frame comprises:
    a sounding dialog token field comprising an NDPA type that indicates a type of the NDPA frame, and wherein the NDPA type occupies two bits that are set to 00 to indicate that the NDPA frame is a very high throughput (VHT) NDPA frame, to 01 that indicates that the NDPA frame is a high efficiency (HE) NDPA frame, to 10 to indicate that the NDPA frame is a ranging NDPA frame, or to 11 to indicate that the NDPA frame is an extremely high throughput (EHT) NDPA frame; and
    one or more pieces of station information comprising a processing mode bitmap that indicates processing modes of channel state information of respective feedback elements; and
  a processor coupled to the transceiver and configured to determine the type of the NDPA frame.

18. The apparatus according to claim 17, wherein the sounding dialog token field further comprises a sounding dialog token number that identifies a sounding dialog.

19. The apparatus according to claim 17, wherein the NDPA frame is a media access control (MAC) frame and further comprises a MAC header, one or more pieces of station information, and a frame check sequence (FCS) field, and wherein the MAC header comprises a frame control field that indicates a type of the MAC frame, a duration field that indicates a duration of occupying a channel by the MAC frame and a corresponding acknowledgment frame, a receiving address (RA) field, that identifies a receive end of the MAC frame, and a transmitting address (TA) field that identifies a transmit end of the MAC frame.

20. The apparatus according to claim 19, wherein the one or more pieces of station information comprise the processing mode bitmap, applicable to a beamformee corresponding to the station information, wherein the processing mode bitmap comprises bits, wherein every n bits of the bits correspond to a feedback element, wherein a value of the n bits indicates a processing mode of channel state information of the corresponding feedback element, wherein n is a positive integer, and wherein the feedback element is a segment, a resource, or a channel.

\* \* \* \* \*